(12) United States Patent
Steinert et al.

(10) Patent No.: US 12,104,602 B2
(45) Date of Patent: Oct. 1, 2024

(54) CROSS-FLOW FAN

(71) Applicant: Levitronix GmbH, Zürich (CH)

(72) Inventors: Daniel Steinert, Bülach (CH); Thomas Holenstein, Umiken (CH); Ivana Bagaric, Zürich (CH)

(73) Assignee: LEVITRONIX GMBH, Zürich (CH)

( * ) Notice: Subject to any disclaimer, the term of this patent is extended or adjusted under 35 U.S.C. 154(b) by 0 days.

(21) Appl. No.: 17/579,733

(22) Filed: Jan. 20, 2022

(65) Prior Publication Data
US 2022/0260078 A1 Aug. 18, 2022

(30) Foreign Application Priority Data

Feb. 18, 2021 (EP) .................................... 21157946

(51) Int. Cl.
*F04D 17/04* (2006.01)
*F04D 25/06* (2006.01)
*F04D 29/048* (2006.01)

(52) U.S. Cl.
CPC ......... *F04D 17/04* (2013.01); *F04D 25/0633* (2013.01); *F04D 25/0646* (2013.01); *F04D 29/048* (2013.01)

(58) Field of Classification Search
CPC .... F04D 25/08; F04D 25/0613; F04D 25/062; F04D 25/064; F04D 25/0646; F04D 17/04; F04D 29/048
See application file for complete search history.

(56) References Cited

U.S. PATENT DOCUMENTS 5,258,676 A * 11/1993 Reinhardt ................ H02K 7/14
310/67 R
5,848,089 A * 12/1998 Sarkar ..................... H01S 3/036
372/98

(Continued)

FOREIGN PATENT DOCUMENTS

CN 1299035 A 6/2001
EP 3595137 A1 1/2020

(Continued)

OTHER PUBLICATIONS

Extended European Search Report issued Jul. 13, 2021 in corresponding European Patent Application No. 21157946.1, filed Feb. 18, 2021.

*Primary Examiner* — Thomas Fink
(74) *Attorney, Agent, or Firm* — GLOBAL IP COUNSELORS, LLP

(57) ABSTRACT

A cross-flow fan includes a cylindrical impeller having an annularly designed first magnetically effective core disposed at a first end, an annularly designed second magnetically effective core disposed at a second end, a plurality of vanes arranged between the first magnetically effective core and the second magnetically effective core, a first stator, which is a bearing and drive stator, and which interacts with the first magnetically effective core as a first electromagnetic rotary drive, and a second stator, which is at least a bearing stator, and with which the second magnetically effective core is capable of being magnetically levitated without contact with respect to the second stator. The impeller is magnetically driven without contact by the first and the second stators and magnetically levitated without contact with respect to the first stator and the second stator.

16 Claims, 13 Drawing Sheets

(56) References Cited

U.S. PATENT DOCUMENTS

| | | | | |
|---|---|---|---|---|
| 5,939,813 | A * | 8/1999 | Schob | F04D 29/041 |
| | | | | 310/90 |
| 6,597,719 | B1 * | 7/2003 | Nara | H01S 3/036 |
| | | | | 372/55 |
| 6,898,229 | B2 * | 5/2005 | Yada | F16C 32/0444 |
| | | | | 372/78 |
| 9,709,059 | B2 * | 7/2017 | Liang | F04D 29/4293 |
| 2003/0202880 | A1 * | 10/2003 | Koochingchai | F04D 25/166 |
| | | | | 415/53.1 |
| 2007/0020128 | A1 * | 1/2007 | Chang | F04D 19/007 |
| | | | | 417/423.5 |
| 2007/0063603 | A1 * | 3/2007 | Levine | D06F 37/206 |
| | | | | 310/85 |
| 2007/0257572 | A1 * | 11/2007 | Nakano | H02K 3/522 |
| | | | | 310/71 |
| 2008/0310960 | A1 * | 12/2008 | Amada | F04D 29/666 |
| | | | | 416/223 R |
| 2010/0158664 | A1 * | 6/2010 | Ko | F04D 17/04 |
| | | | | 415/53.1 |
| 2011/0241467 | A1 * | 10/2011 | Fujioka | H02K 1/146 |
| | | | | 310/156.08 |
| 2013/0097860 | A1 * | 4/2013 | Behner | B21D 39/038 |
| | | | | 29/889 |
| 2013/0106257 | A1 * | 5/2013 | Song | H02K 11/33 |
| | | | | 310/68 R |
| 2014/0175912 | A1 * | 6/2014 | Germann | H02K 3/522 |
| | | | | 310/90 |
| 2018/0058460 | A1 * | 3/2018 | Lee | F04D 29/058 |
| 2020/0021166 | A1 * | 1/2020 | Nussbaumer | H02K 1/28 |
| 2020/0309155 | A1 * | 10/2020 | He | F04D 29/624 |
| 2020/0392961 | A1 | 12/2020 | Holenstein et al. | |

FOREIGN PATENT DOCUMENTS

| | | | |
|---|---|---|---|
| EP | 3754204 | A1 | 12/2020 |
| JP | S5594482 | * | 6/1980 |
| JP | S5594482 | U | 6/1980 |
| JP | 2001274486 | A | 10/2001 |
| JP | 2003193994 | A | 7/2003 |

* cited by examiner

CROSS-FLOW FAN

CROSS-REFERENCE TO RELATED APPLICATION

This application claims priority to European Patent Application No. 21157946.1, filed Feb. 18, 2021, the contents of which are hereby incorporated by reference in their entirety.

BACKGROUND

Field of the Invention

This disclosure relates to a cross-flow fan for generating a fluid flow.

Background Information

Conventional cross-flow fans, which are also designated as tangential fans, generally have a cylindrical impeller extending in an axial direction from a first end to a second end. The impeller, which is often also designated as a roller, has a plurality of vanes arranged along the circumference, each extending from the first end to the second end. The aspirated fluid, usually a gas, such as air, is aspirated along the entire length of the impeller, flows into the rotating impeller, and is then blown out uniformly along the entire length of the impeller. Cross-flow fans have the advantage that the aspirated fluid can be distributed evenly over a wide area by the long impeller. Cross-flow fans are compact and therefore space-saving, they are robust, durable and quiet.

The range of application of cross-flow fans is very wide. It ranges from very simple applications, such as in air conditioning systems, to extremely demanding applications, such as the gas circulation in excimer lasers. Such gas discharge lasers are used, for example, in lithography devices that are used in the semiconductor industry to manufacture tiny integrated circuits or for the production of microchips. However, excimer lasers are also used in completely different fields, for example in ophthalmology. Excimer lasers require an internal fan which circulates the laser gas. Here, it is very important that the activated gas, which is required for the generation of the laser pulse, is constantly renewed between the discharge electrodes to ensure sufficient laser power. For this purpose, very high flow rates of the gas are required, which is why it is common today to use cross-flow fans in excimer lasers for the gas circulation, which are operated at extremely high rotational speeds. Another challenge is that the gas in an excimer laser is usually very aggressive and represents an extremely challenging chemical environment. Furthermore, it is important that impurities in the gas are avoided as far as possible.

However, such high requirements with respect to chemically aggressive fluids or the high requirements for the purity of the conveyed fluid do not only exist in excimer lasers, but also in other applications in the semiconductor industry, in the pharmaceutical industry or in biotechnology.

Therefore, it is known for cross-flow fans to do without mechanical bearings for the impeller if possible, and to drive and levitate the impeller without contact using magnetic or electromagnetic forces. On the one hand, due to this contactless levitation, it is possible to protect the fluid to be conveyed against impurities, which are caused, for example, by abrasion in the case of mechanical bearings. On the other hand, it is also possible to completely protect certain components of the levitation and drive devices against contact by the fluid to be conveyed.

SUMMARY

In the case of these cross-flow fans, at least two magnetic bearings are usually provided between which the impeller is arranged. Then, the impeller has, for example, a centrally arranged shaft extending in the axial direction, each end of the shaft being supported in a magnetic bearing. In the case of magnetic bearings, a basic distinction is made between a passive and an active magnetic bearing. A passive magnetic bearing or stabilization cannot be controlled or regulated. It is usually based on reluctance forces. Thus, passive magnetic bearings or stabilizations operate without external energy supply. An active magnetic bearing is a bearing that can be controlled. In the case of an active magnetic bearing, the position of the body to be supported can be actively influenced or regulated, for example, by impressing electromagnetic fields.

A particularly compact design for the drive and levitation of the impeller in a cross-flow fan is made possible by the fact that the electromagnetic rotary drive of the cross-flow fan is designed according to the principle of the bearingless motor. In the meantime, the bearingless motor is sufficiently known to the person skilled in the art, so that a detailed description of its function is no longer necessary. The stator of the bearingless motor is designed as a bearing and drive stator with which the rotor, in the operating state, can be driven magnetically without contact about the axial direction—i.e. can be set in rotation—and can be magnetically levitated without contact with respect to the stator. The axial direction is defined by the desired axis of rotation of the rotor.

The term bearing-less motor refers to the fact that the rotor is magnetically levitated without contact, wherein no separate magnet bearings are provided. The stator is both the stator of the electric drive and the stator of the magnetic levitation. The stator comprises windings, with which a magnetic rotary field can be generated, which on the one hand exerts a torque on the rotor, which causes its rotation, and which on the other hand exerts a freely adjustable transverse force on the rotor so that its radial position—i.e., its position in the radial plane perpendicular to the axial direction A—can be actively controlled or regulated.

It is a substantial aspect of the principle of the bearingless motor that no distinction can be made between a bearing unit and a drive unit in the bearing and drive stator. For example, electromagnetic drive and bearing devices are known in which the stator of the drive and the stator of the magnetic levitation are joined together to form a structural unit. Here, the stator comprises one or more bearing units and a drive unit, which can be arranged between two bearing units, for example. Thus, such devices present a bearing unit which can be separated from the drive unit and is used exclusively for magnetic bearing. However, such devices are not to be understood as bearingless motors within the meaning of the present application, because separate bearing units are actually present here, which realize the bearing of the rotor separately from the drive function. In the case of a bearingless motor within the meaning of the present application, it is not possible to divide the stator into a bearing unit and a drive unit. It is precisely this characteristic that gives the bearingless motor its name.

From U.S. Pat. No. 6,404,794, a cross-flow fan is known in which the impeller is driven and supported according to the principle of the bearingless motor. There, an excimer laser is proposed that comprises a cross-flow fan. The impeller of the cross-flow fan has a shaft extending centrally through the impeller in the axial direction. At least for one of the two ends of the shaft a rotor-stator mechanism is provided, which is designed according to the principle of the bearingless motor. The other of the two ends is supported by a magnetic bearing, or as an alternative, a rotor-stator mechanism is also provided at this other end, which is designed according to the principle of the bearingless motor. Each rotor-stator mechanism comprises a rotor of a magnetic material that is fixedly connected to the shaft, and a stationary stator that is arranged around the respective rotor. The stationary stator has a total of twenty-four coil cores, each of which extends inward in the radial direction. Coils for generating electromagnetic fields are arranged around each of the coil cores, wherein each coil core carries two separate coils. A part of these coils forms a three-phase and four-pole (pole pair number two) winding system, which generates a four-pole rotating field that exerts a torque on the rotor to drive it. The other part of the coils forms a three-phase and two-pole (pole pair number one) winding system, with which a rotating two-pole control field is generated. Here, the windings are designed as distributed windings, i.e., in each case as a winding that extends over several stator teeth. Due to the interaction of the four-pole rotating field with the two-pole control field, the rotor can be magnetically levitated without contact in the stator and a freely adjustable transverse force can be generated in the radial direction with which the radial position of the rotor can be regulated. In this way, the rotor can be driven without contact for rotation and can be magnetically levitated without contact in the stator.

Even though the magnetic bearing of the rotor in cross-flow fans has proven its worth, there is still room for improvement, in particular with regard to the most compact possible design of the cross-flow fan while maintaining very high performance.

Starting from this state of the art, it is therefore an object of the disclosure to describe a very compact and at the same time powerful cross-flow fan, which is designed according to the principle of the bearingless motor and thus enables a contactless magnetic levitation and a contactless drive of the impeller. In particular, the cross-flow fan should also be able to be designed for use in chemically aggressive or challenging environmental conditions, such as those prevailing in the semiconductor industry and in particular in excimer lasers. In addition, impurities in the conveyed fluid are to be avoided as far as possible, so that the cross-flow fan can also be used for applications with very high demands on the purity of the conveyed fluid, for example in the pharmaceutical industry or in biotechnology.

The subject matter of embodiments of the invention meeting this object is characterized by the features described herein.

According to an embodiment of the invention, a cross-flow fan for generating a fluid flow is proposed, with a cylindrical impeller extending in an axial direction from a first end to a second end, wherein an annularly designed first magnetically effective core is provided at the first end, and an annularly designed second magnetically effective core is provided at the second end, wherein a plurality of vanes is provided, each of which is arranged between the first magnetically effective core and the second magnetically effective core with respect to the axial direction, wherein a first stator is provided, which is designed as a bearing and drive stator, and which interacts with the first magnetically effective core as a first electromagnetic rotary drive, wherein a second stator is provided, which is designed at least as a bearing stator, with which the second magnetically effective core can be magnetically levitated without contact with respect to the second stator, wherein the impeller (2) can be magnetically driven without contact by the first and the second stator and can be magnetically levitated without contact with respect to the first stator and the second stator, wherein the first stator is arranged within the first magnetically effective core such that the first magnetically effective core surrounds the first stator.

Preferably, the fluid flow is a gas flow, such as an air flow or the flow of a laser gas in an excimer laser.

To enable a very compact design of the cross-flow fan, the first electromagnetic rotary drive of the fan is designed according to the principle of the bearingless motor and in addition with a radially internal stator. This means that the first electromagnetic rotary drive is designed as an external rotor so that the first magnetically effective core is arranged radially outwardly around the first stator. This has the great advantage that the first stator can be arranged inside the impeller, at the first end of which the first magnetically effective core is provided. This enables an extremely compact design of the cross-flow fan because it is no longer necessary to lead out a shaft at both axial ends of the impeller, which is then driven and supported. In addition, the cross-flow fan offers all the advantages of the bearingless motor, such as the completely contactless levitation, the contactless drive of the impeller, the possibility of very high rotational speeds, and the freedom from friction and wear.

The second stator, which is provided at the second end of the impeller, and which interacts with the second magnetically effective core to magnetically levitate the second magnetically effective core without contact, can be the stator of a classical magnetic bearing known per se. Then, the second magnetically effective core forms, together with the second stator, a magnetic bearing for contactless levitation of the impeller. The second stator can be arranged radially inwardly of the impeller so that the second magnetically effective core surrounds the second stator. Of course, it is also possible that the second stator is arranged radially outwardly around the impeller so that the second stator surrounds the second magnetically effective core.

According to a particularly preferred embodiment, the second stator is also designed as a bearing and drive stator that can interact with the second magnetically effective core as a second electromagnetic rotary drive to exert a torque on the second magnetically effective core, wherein the second stator is preferably arranged within the second magnetically effective core such that the second magnetically effective core surrounds the second stator.

This embodiment enables a very particularly compact design of the cross-flow fan. The first and the second electromagnetic rotary drive are each designed as external rotors, so that the first magnetically effective core is arranged radially outwardly around the first stator, and the second magnetically effective core is arranged radially outwardly around the second stator. This has the great advantage that both stators can be arranged inside the impeller, at each end of which one of the two magnetically effective cores is provided in each case. Since a stator is provided in each case at both ends of the impeller, which is designed as a bearing and drive stator, very high torques can be generated to drive the impeller.

However, depending on the application, in this embodiment with two stators, each designed as bearing stator and drive stator, it is by no means necessary to generate a torque with both the first stator and the second stator to drive the rotation of the impeller. For example, it is also possible to generate a torque acting on the first magnetically effective core with the first stator only, and to operate the second stator such that it does not generate a torque that drives the rotation of the impeller.

In this embodiment, the first and the second stator are each designed as bearing and drive stator, with which the impeller can be magnetically driven in the operating state without contact about the axial direction—i.e., can be set in rotation—and can be magnetically levitated without contact with respect to the two stators. The axial direction is defined by the desired axis of rotation of the impeller.

Within the framework of this application, the term bearingless motor thus means that the first and second magnetically effective cores of the impeller are each magnetically levitated without contact, so that the entire impeller is magnetically levitated without contact, wherein no separate magnetic bearings are provided. The first and optionally also the second stator are each both stator of the electromagnetic rotary drive and stator of the magnetic levitation. Each stator comprises windings with which a magnetic rotating field can be generated which, on the one hand, exerts a torque on the respective magnetically active core of the impeller, causing its rotation, and which, on the other hand, exerts a freely adjustable transverse force on the respective magnetically active core so that its radial position—i.e., its position in the radial plane perpendicular to the axial direction—can be actively controlled or regulated. Thus, at least three degrees of freedom of the impeller can be actively regulated. With respect to its deflection in the axial direction, the impeller can be passively magnetically stabilized, i.e. it cannot be controlled, by reluctance forces. With respect to the remaining two degrees of freedom, namely tilting with respect to the radial plane perpendicular to the axial direction, the impeller is preferably actively magnetically levitated or stabilized.

As already mentioned, it is also possible to operate one of the two stators in such a way that it does not generate any torque which drives the impeller for rotation, or to design only the first stator as bearing and drive stator and to provide a normal magnetic bearing at the other end of the impeller which does not perform any drive function. This means that it is possible to drive the impeller at only one of its two ends as well as to drive the impeller at both of its ends. If both stators are each designed as bearing and drive stators, it is also possible to drive the impeller optionally only at one or both of its ends, because in the case of this embodiment it is only a question of the control of the stators whether the impeller is driven for rotation only at one of its two ends or at both ends.

Preferably, the first stator is encapsulated in a first stator housing of a low-permeable material, and the second stator is encapsulated in a second stator housing of a low-permeable material. Furthermore, it is possible—and also preferred—that the first and the second magnetically effective core are each arranged in a sheath which completely encloses the respective magnetically effective core. These sheaths are also preferably made of a low-permeable material, which may or may not be the same as the material from which the stator housings are made.

In a particularly preferred embodiment, both the first magnetically effective core and the second magnetically effective core as well as each stator are completely and preferably hermetically enclosed. In this way, the magnetically effective cores of the impeller as well as the stators and in particular, for example, the windings of the stators or the coil cores of the stators are reliably protected, in particular also in chemically aggressive environments in which the cross-flow fan may come into contact with corrosive gases, vapors or other corrosive or acidic fluids, for example in an excimer laser.

The magnetically effective cores of the impeller and the stators are also reliably protected against aggressive gases, such as fluorine, chlorine, or acid vapors. By completely enclosing the magnetically effective cores and/or the stators, the cross-flow fan has significantly higher corrosion resistance and a considerably longer service life, even in aggressive environments.

According to this preferred embodiment, each magnetically effective core of the impeller is completely enclosed in the respective sheath. Each stator is encapsulated in the respective stator housing, which is made of a low-permeable material, i.e., a material that has only a low magnetic permeability (magnetic conductivity). This low-permeable material can be, for example, a plastic, a metal, or a ceramic. Within the framework of this application, such materials are understood to be low-permeable—as is generally the case—whose permeability number (relative permeability) deviates only slightly or not at all from 1 (permeability number of the vacuum). In any case, a low-permeable material has a permeability number that is less than 1.1.

Due to the complete sheathing of the magnetically effective core of the impeller as well as the stators, both the sheath of the magnetically effective core and a wall of the stator housing must be arranged in the magnetic air gap between the respective magnetically effective core and the respective stator. With respect to the radial direction, this requires a large distance between the magnetically interacting parts of the impeller and the stators, i.e., the magnetic air gap in the magnetic circuit of the magnetically effective core and the associated stator is large in each case. Surprisingly, despite this large magnetic air gap, a reliable and stable levitation of the impeller is possible with respect to the stators.

Preferably, the sheaths of the magnetically effective cores and the stator housings include a plastic or of a ceramic or a ceramic material or of a metal or of a corrosion-resistant metal alloy with poor electrical conductivity, such as a titanium-aluminum alloy, in particular Ti6Al-4V/Ti6, or a nickel-chromium-molybdenum alloy. If the sheaths and/or the stator housings are made of a metallic material, this metallic material is preferably one that has low electrical conductivity, in particular to keep eddy current losses in the sheaths and the stator housings low. In particular, it is also possible that the sheaths and the stator housings consist of different materials. Thus, for example, the sheaths can include a first plastic or a first ceramic material or a first metallic material, while the stator housings includes a second plastic or a second ceramic material or a second metallic material. Here, the first and the second plastic can be the same plastic, or the first and the second plastic are different plastics. The first and the second ceramic materials can also be identical or different, and the first and the second metallic materials may can identical or different. In the case of metallic materials, those metal alloys that are corrosion-resistant and have low electrical conductivity are particularly preferred.

Depending on the application, it is further preferred to manufacture the vanes from a particularly resistant material, for example a corrosion-resistant alloy or a metal or a plastic. This can also be the material used for the sheath of the magnetically effective cores.

It is a particularly preferred measure that a control device is provided in each stator housing for controlling or regulating the respective stator. This measure of arranging the control device in the respective stator housing enables a particularly compact and space-saving design, whereby at the same time the control device is excellently protected by the stator housing. The control device, which can comprise in particular the power electronics for generating the electromagnetic fields, the regulating device for the drive and the levitation of the impeller and, if necessary, sensors or evaluation units, is integrated or built into the stator housing. Thus, the respective stator housing only needs to be supplied with energy from the outside and, if necessary, with signals, for example to start or to stop the cross-flow fan or to adjust the rotational speed. For this purpose, a supply line can be provided, which provides electrical energy to the respective stator housing.

Preferably, each stator housing has a first housing portion and a second housing portion, wherein the first housing portion is arranged within the impeller and is surrounded by one of the magnetically effective cores of the impeller, and wherein the second housing portion has an outer diameter which is at least as large as an outer diameter of the magnetically effective core. In particular, the first housing portion and the second housing portion are each designed cylindrically, wherein the first housing portion has a smaller outer diameter than the second housing portion. Thus, the respective stator can be arranged in the first housing portion, which is then inserted into the associated magnetically effective core of the fan. Then, for example, the second housing portion can abut the fan housing, which forms a stop for the second housing portion, so that the stator housing is in a well-defined position.

Furthermore, it is preferred that each control device is arranged in one of the second housing portions. Due to this measure, there is a spatial separation between the stator arranged in the first housing portion and the control device arranged in the second housing portion. This spatial separation is very advantageous, in particular from a thermal point of view, because in the operating state the control device and in particular its electronic components are much less exposed to the heat or temperature which is generated, for example, by the operation of the rotary drive or which is introduced by the fluid into the first housing portion of the stator housing. For example, in an excimer laser, the temperature of the gas to be conveyed can be up to 200° C. or even higher. Since the electromagnetic rotary drive, and in particular the stator, can generally be exposed to higher temperatures than the control device, the spatial spacing of the stator and control device is particularly advantageous.

Particularly preferably, the impeller is designed without a shaft. The shaft of the impeller provided in known cross-flow fans, which usually extends centrally through the impeller in the axial direction and projects beyond the impeller at both ends thereof so that the two ends of the shaft can be received by bearing or drive devices, is no longer necessary in the cross-flow fan according to the invention, so that such a shaft can be dispensed with. This means a significant simplification, in particular in terms of structural design. Furthermore, one or more flow guide elements can be arranged in a simple manner inside the impeller to guide the fluid flow, for example a baffle plate.

According to a preferred embodiment, each stator comprises a plurality of coil cores, each of which extends in the radial direction, wherein each coil core carries exactly one concentrated winding. The concentrated winding serves to generate an electromagnetic rotating field. The coil cores are also designated as stator teeth.

Particularly preferably, the number of coil cores for each stator is exactly three, or exactly four, or exactly five, or exactly six.

It is a further preferred measure that each magnetically effective core of the impeller comprises a plurality of permanent magnets.

Here, it is particularly preferred that each magnetically effective core of the impeller comprises an annular reflux which is continuously designed and is made of a soft magnetic material, wherein each permanent magnet is arranged on the radially inner side of the reflux. With this embodiment, a very good torque and a very good rigidity of the magnetic levitation can be achieved.

In particular from a practical point of view, it is preferred that each permanent magnet is designed as a ring segment, wherein the permanent magnets of each magnetically effective core complement each other to form a ring.

Preferably, each permanent magnet is magnetized in the radial direction, wherein permanent magnets arranged adjacent to each other in the circumferential direction are each oppositely magnetized.

In particular, such embodiments are preferred in which the number of permanent magnets for each magnetically effective core is exactly four, or exactly eight, or exactly ten, or exactly twelve.

To further protect the control device against thermal effects, it can be advantageous to provide a thermal protection layer in each stator housing between the stator and the control device.

With regard to reducing the thermal load, it can be advantageous that each stator is designed to be coolable. For example, this can be realized by providing cooling lines between the coil cores, where the windings are also arranged, through which a fluid cooling medium, such as water, can flow.

Further advantageous measures and embodiments of the invention result from the dependent claims.

BRIEF DESCRIPTION OF THE DRAWINGS

The invention will be explained in more detail hereinafter with reference to the drawings.

DETAILED DESCRIPTION

Figure 1:
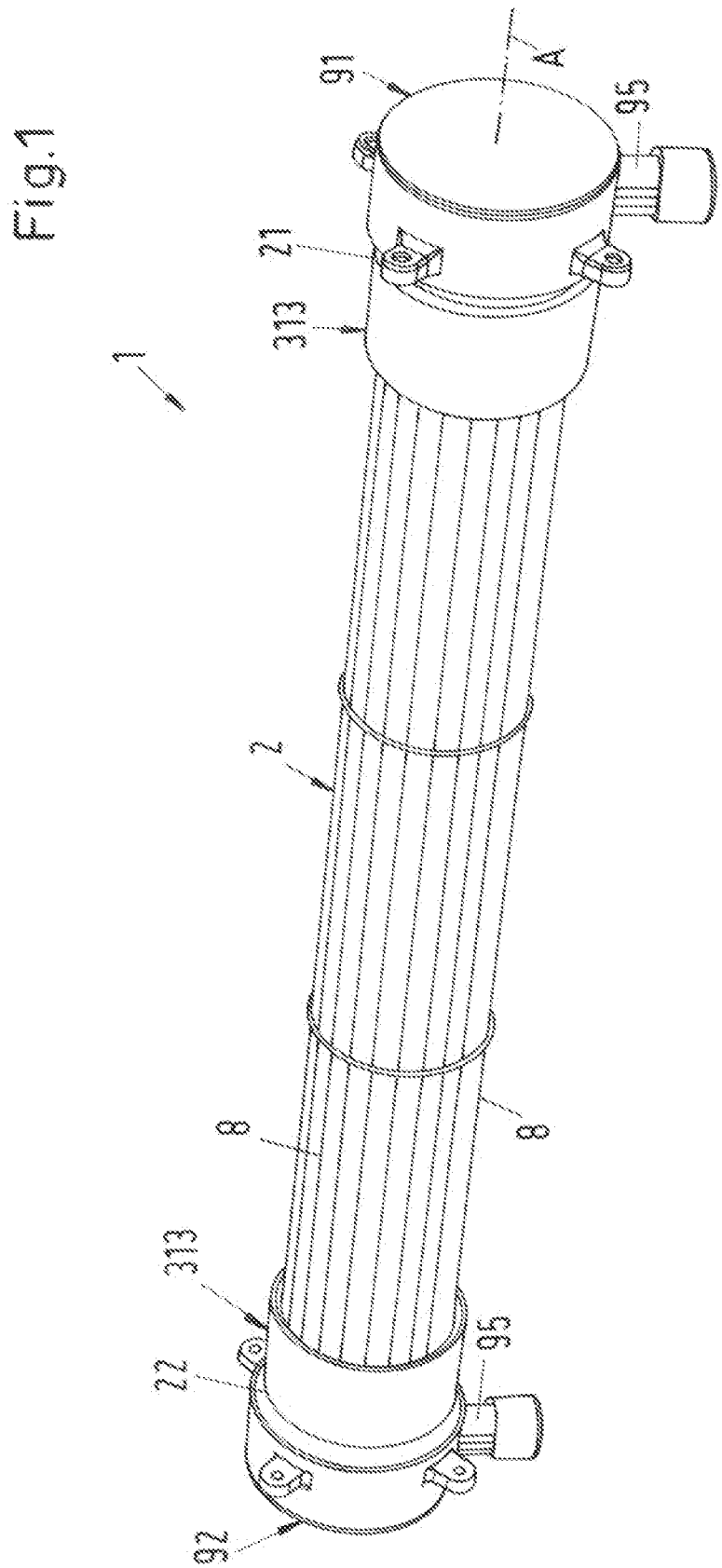
FIG. 1 is a perspective representation of a first embodiment of a cross-flow fan according to the invention (without fan housing)

FIG. 1 shows in a perspective representation a first embodiment of a cross-flow fan according to the invention, which is designated as a whole by the reference sign 1. For a better understanding, FIG. 2 still shows a sectional representation of this embodiment in a section along an axial direction A, whereby a fan housing 10 is additionally represented in FIG. 2, which is not represented in FIG. 1.

The cross-flow fan 1 comprises a cylindrical impeller 2, which is sometimes also designated as a roller. The impeller 2 extends in the axial direction A from a first end 21 to a second end 22, and is designed to rotate about the axial direction A. The axial direction A is defined by the desired axis of rotation about which the impeller is to rotate in the operating state. This coincides with the cylinder axis of the impeller 2.

A direction perpendicular to the axial direction is designated as the radial direction.

An annularly designed first magnetically effective core 31 (FIG. 2) is provided at the first end 21 of the impeller 2. An annularly designed second magnetically effective core 32 is provided at the second end of the impeller 2. Furthermore, the impeller 2 comprises a plurality of vanes 8, each of which is arranged between the two ends 21, 22 with respect to the axial direction A and extends from a sheath 313 of the first magnetically effective core 31 in the axial direction A and parallel to the desired axis of rotation to a sheath 313 of the second magnetically effective core 32. Each vane 8 is connected in a torque-proof manner to both the first magnetically effective core 31 and the second magnetically effective core 32.

As is known from conventional cross-flow fans, the vanes 8 are arranged spaced along the circumference of the impeller 2 so that the fluid to be conveyed, typically a gas, is aspirated into the interior of the impeller 2 between the vanes 8 on the suction side and discharged from the interior of the impeller 2 between the vanes 8 on the pressure side.

The impeller 2 is arranged in the fan housing 10 (FIG. 2), which can be designed in a manner known per se. The fan housing 10 typically comprises an intake area 20 through which the fluid to be conveyed is aspirated into the interior of the impeller 2 along the entire length of the impeller 2, and a discharge area 30 through which the fluid to be conveyed is discharged from the interior of the impeller 2 along the entire length of the impeller 2. The length of the impeller 2 refers to its extension in the axial direction A.

The cross-flow fan 1 further comprises a first stator 41, which is designed as bearing and drive stator, and which interacts with the first magnetically effective core 31 as a first electromagnetic rotary drive. In this case, the first electromagnetic rotary drive is designed as an external rotor, i.e., the part not rotating in the operating state, namely the first stator 41, is arranged internally in the part rotating in the operating state, namely the first magnetically effective core 31, so that the first magnetically effective core 31 surrounds the first stator 41.

The cross-flow fan 1 further comprises a second stator 42, which is designed at least as beating stator, with which the second magnetically effective core 32 can be magnetically levitated without contact with respect to the second stator 42.

In the first embodiment described here, the second stator 42 is also designed as bearing and drive stator and can interact with the second magnetically effective core 32 as a second electromagnetic rotary drive. In this embodiment, the second electromagnetic rotary drive is designed as an external rotor, i.e., the part not rotating in the operating state, namely the second stator 42, is arranged internally in the part rotating in the operating state, namely the second magnetically effective core 32, so that the second magnetically effective core 32 surrounds the second stator 42.

Thus, the first stator 41 and the second stator 42 are each arranged inside the impeller 2 in such a way that the first stator 41 is surrounded by the first magnetically effective core 31, and the second stator 42 is surrounded by the second magnetically effective core 32. Since the first magnetically effective core 31 and the second magnetically effective core 32 are connected to each other in a torque-proof manner via the vanes 8, the impeller 2 rotates around the internally arranged stators 41, 42 in the operating state.

Both the first electromagnetic rotary drive and the second electromagnetic rotary drive are designed according to the principle of the bearingless motor and comprise the first and the second magnetically effective core 31 or 32, which can be magnetically driven without contact and is designed without a coil, and the first or the second stator 41 or 42, which is designed as bearing and drive stator, with which the magnetically effective core 31 or 32 can be magnetically driven without contact about the desired axis of rotation in the operating state and can be magnetically levitated without contact with respect to the stator 41 or 42.

The desired axis of rotation about which the impeller 2 is to rotate in the operating state is the axis of rotation about which the impeller 2 rotates when it is in a centered and non-tilted position with respect to the stators 41, 42. Then, the impeller 2 is centered with respect to the radial direction in both stators 41, 42. The desired axis of rotation normally coincides with the center axes of the two stators 41 and 42. The two stators 41 and 42 are arranged in such a way that their center axes are aligned with each other, i.e., they lie on the same axis in the axial direction A. For each stator 41, 42, the radial plane is designated as the plane perpendicular to the desired axis of rotation or to the axial direction A, which is the magnetic center plane of the stator 41, 42. For each stator 41, 42, the radial plane defines the x-y plane of a Cartesian coordinate system whose z-axis extends in the axial direction A. The radial plane of the first stator 41 is parallel to the radial plane of the second stator 42.

Particularly preferably, the first electromagnetic rotary drive, which comprises the first magnetically effective core 31 and the first stator 41, and the second electromagnetic rotary drive, which comprises the second magnetically effective core 32 and the second stator 42, are at least substantially identically designed. In the following description of the electromagnetic rotary drives and in particular in the description of FIG. 3, FIG. 4 and FIG. 5, reference is therefore made predominantly only to the first electromagnetic rotary drive, because this is sufficient for understanding. It is understood that these explanations are given by way of example on the basis of the first electromagnetic rotary drive and apply in the same way or in the analogously same way to the second electromagnetic rotary drive.

However, it should be emphasized that even though the two electromagnetic rotary drives are designed to be at least substantially identical, they need not be operated in the identical manner in the operating state of the cross-flow fan 1. Thus, for example, it is possible to generate the torque that drives the rotation of the impeller 2 by only one of the two electromagnetic rotary drives, and to use the other of the two electromagnetic rotary drives only to generate levitation forces for the contactless magnetic levitation of the impeller 2, so that a torque is generated at only one of the two ends 21, 22 that drives the rotation of the impeller 2. Of course, it is also possible that a torque is generated with each of the two electromagnetic rotary drives, which drives the rotation of the impeller 2, so that a torque acts on the impeller 2 at both ends 21, 22, which drives its rotation. It is understood that in this case the torques impressed at the two ends 21, 22 for driving the impeller 2 may be equal or even different in amount.

Figure 2:
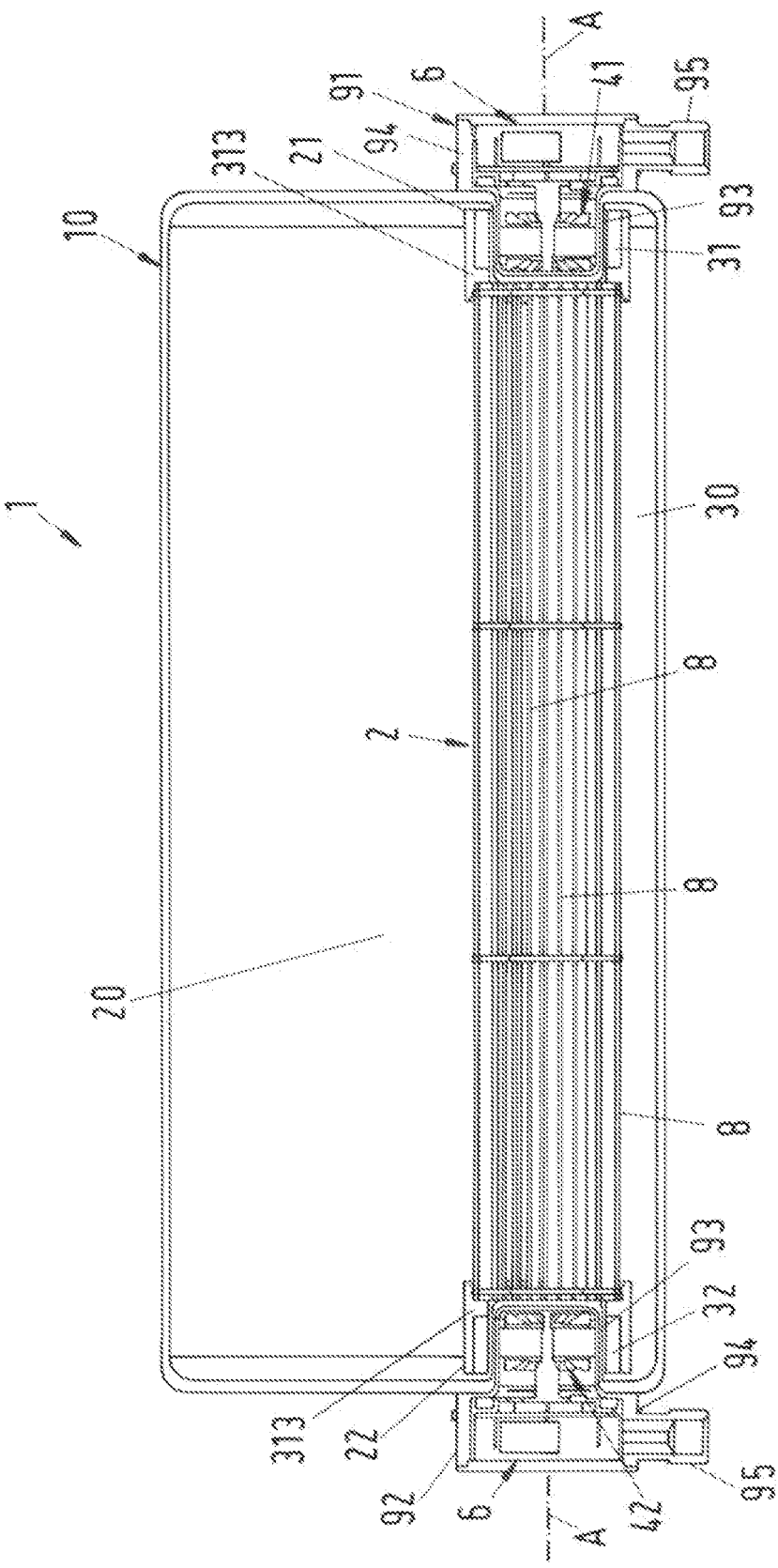
FIG. 2 is a section in the axial direction through the embodiment from FIG. 1, whereby the fan housing is additionally shown along the section line II-II in FIG. 1.
Figure 3:
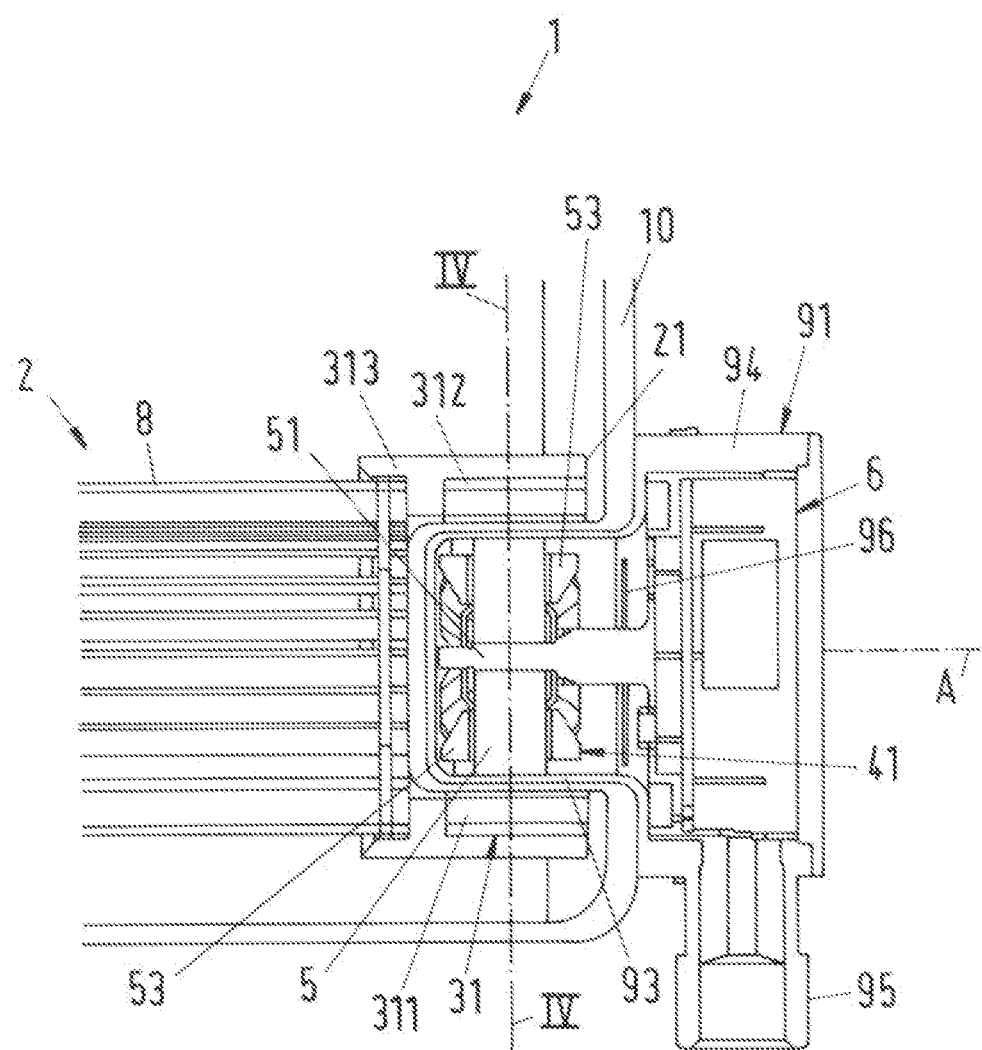
FIG. 3 is an enlarged representation of the first electromagnetic rotary drive in a representation analogous to FIG. 2.
Figure 4:
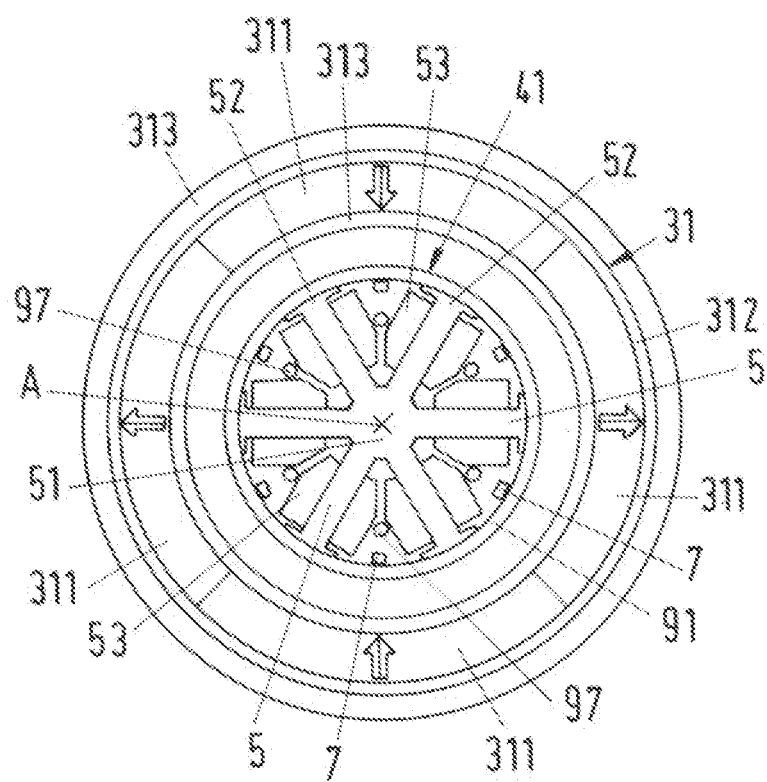
FIG. 4 is a section through the first electromagnetic rotary drive perpendicular to the axial direction along the section line IV-IV in FIG. 3.
Figure 5:
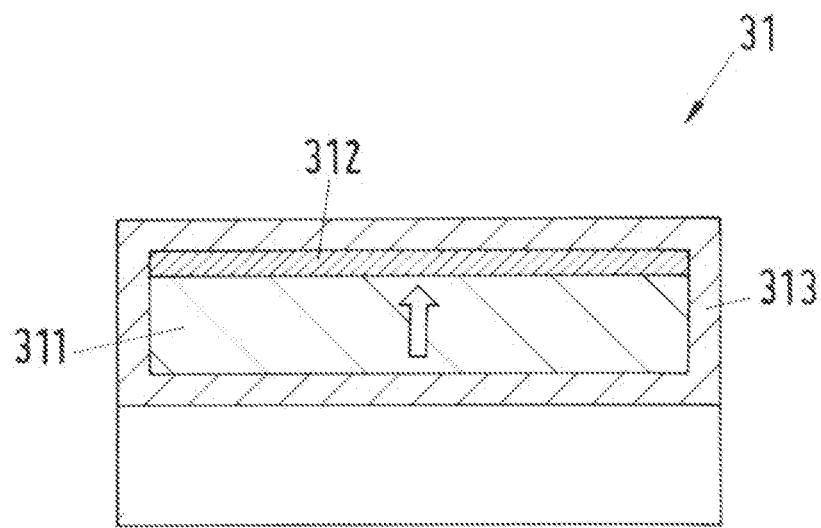
FIG. 5 is a cross-section of the first magnetically effective core, whereby the section is made in the radial direction.

For a better understanding, FIG. 3 shows an enlarged representation of the first electromagnetic rotary drive in a representation analogous to FIG. 2. FIG. 4 shows a section through the first electromagnetic rotary drive perpendicular to the axial direction A along the section line IV-IV in FIG. 3. The section in FIG. 4 is made perpendicular to the axial direction A in the radial plane of the first stator 41, i.e., in the magnetic center plane of the first stator 41. FIG. 5 shows a cross-section of the first magnetically effective core 31, wherein the section is made in the radial direction.

The impeller 2 of the cross-flow fan 1 comprises the two magnetically effective cores 31 and 32, one of which is arranged at the first end 21 of the impeller 2 and the other at the second end 22 of the impeller 2. The impeller 2 is designed without coils, i.e., no windings are provided on the impeller 2 and in particular on the magnetically effective cores 31, 32 of the impeller 2. The first and second magnetically effective core 31 and 32 of the rotor 2 refer to those areas of the impeller 2 which interact magnetically with the first stator 41 and the second stator 42 for torque generation and for the generation of the magnetic levitation forces. Each magnetically effective core 31, 32 is annularly designed and arranged around the first stator 41 or the second stator 42.

In FIG. 3 and FIG. 4, the first electromagnetic rotary drive is represented, which comprises the first magnetically effective core 31 and the first stator 41. In FIG. 5, a cross-section through the first magnetically effective core 31 in the radial direction is shown. The first magnetically effective core 31 is designed in the form of an annular disk, or a circular cylindrical ring. The first magnetically effective core 31 comprises an annular, radially outwardly arranged reflux 312, and at least one permanent magnet 311, which can be designed as a permanent magnetic ring, for example. Of course, it is also possible that a plurality of permanent magnets 311 is provided, each of which is designed as a ring segment, for example. In the embodiment described here—see in particular FIG. 4—a total of four permanent magnets 311 is provided, which complement each other as a whole to form a ring. Viewed in the circumferential direction, all four permanent magnets 311 are of equal length, so that each permanent magnet 311 forms one quarter of the entire permanent magnetic ring. Each permanent magnet 311 is magnetized in the radial or diametrical direction, as shown by the arrows without reference signs in FIG. 4 and FIG. 5. Here, permanent magnets 311 adjacent in the circumferential direction are polarized in opposite directions in each case, i.e., a permanent magnet 311 polarized inward in the radial or diametrical direction and a permanent magnet 311 polarized outward in the radial or diametrical direction are adjacent in each case. The first magnetically effective core 31 is thus designed here with four poles, i.e., with the pole pair number two.

Those ferromagnetic or ferrimagnetic materials which are hard magnetic, that is which have a high coercive field strength, are typically called permanent magnets. The coercive field strength is that magnetic field strength which is required to demagnetize a material. Within the framework of this application, a permanent magnet is understood as a material which has a coercive field strength, more precisely a coercive field strength of the magnetic polarization, which amounts to more than 10,000 A/m. All permanent magnets 311 of the magnetically effective cores 31, 32 of the impeller 2 preferably include neodymium-iron-boron (NdFeB) or samarium-cobalt (SmCo) alloys.

The first magnetically effective core 31 further comprises the annular reflux 312, which is arranged radially outwardly around all of the permanent magnets 311. The reflux 312 encloses all the permanent magnets 311 and consists of a soft magnetic material, because it serves to guide the magnetic flux.

For each magnetically effective core 31, 32 of the impeller 2, the respective sheath 313 is provided, which completely and preferably hermetically encloses the respective magnetically effective core 31, 32, so that each magnetically effective core 31, 32 is encapsulated. The sheath 313 is preferably made of a metal or a corrosion resistant metal alloy or a ceramic or a ceramic material or a plastic. If the sheath 313 is made of a metallic material, it preferably has a low electrical conductivity, in particular to keep eddy current losses as low as possible. Suitable alloys, which in particular have a high corrosion resistance, are for example titanium-aluminum alloys, in particular Ti6Al-4V/Ti6, or nickel-chromium-molybdenum alloys. A suitable metal is, for example, tantalum.

For example, to create the sheath 313, each magnetically effective core 31, 32 can be molded with a plastic or ceramic during the manufacturing process or coated with a metallic material. However, it is also possible to initially provide the sheath 313 made of plastic, ceramic, or a metallic material, in particular a corrosion-resistant, non-ferromagnetic or only weakly ferromagnetic and poorly electrically conductive metallic material, with an annular recess into which the respective magnetically effective core 31, 32 is inserted. Subsequently, the annular recess is closed with a suitably shaped cover made of plastic or a ceramic or a metallic material, which is then joined to the rest of the sheath 313, for example by a welding process. Subsequently, each magnetically effective core 31, 32 of the impeller 2 is hermetically encapsulated.

Each stator 41, 42 comprises a plurality—here exactly six—of coil cores 5, each of which extends in the radial direction, and which are arranged in a star shape. Each coil core 5 is designed in the form of a rod and extends radially outwards from a central pole piece 51 arranged in the center of the respective stator 41, 42 and ends in a rounded pole shoe 52, so that each coil core 5 has a substantially T-shaped appearance overall. The radially outer boundary surfaces of all pole shoes 52 all lie on a circular cylinder that is coaxial with the longitudinal axis of the central pole piece 51.

In order to generate the electromagnetic rotating fields necessary for the magnetic drive and the magnetic levitation of the impeller 2, the coil cores 5 carry windings. For example, in the first embodiment described here, the windings are designed such that exactly one concentrated winding is wound around each coil core 5 as a discrete coil 53. In the operating state, those electromagnetic rotating fields are generated with these coils 53, with which a torque is effected on the impeller 2, and with which a freely adjustable transverse force can be exerted in the radial direction on the respective magnetically effective core 31, 32, so that the radial position of the impeller 2, i.e. its position in the radial plane of the respective stator 41, 42 perpendicular to the axial direction A, can be actively controlled or regulated.

Both the central pole piece 51 and the coil cores 5 of each stator 41, 42 as well as the reflux 312 of each magnetically effective core 31, 32 are each made of a soft magnetic material because they serve as flux guiding elements to guide the magnetic flux. Suitable soft magnetic materials are, for example, ferromagnetic or ferrimagnetic materials, i.e., in particular iron, nickel-iron or silicon-iron. Here, in particular for each stator 41, 42, a design as a stator sheet stack is preferred, in which the coil cores 5 and the central pole piece 51 are designed in sheet metal, i.e., they consist of several thin elements, which are stacked. The reflux 312 of each magnetically effective core 31, 32 can also be designed in sheet metal. As an alternative to the design in sheet metal, soft magnetic composites consisting of electrically insulated and compressed metal particles can also be used for the magnetically effective cores 31, 32 and/or for the stators 41, 42. In particular, these soft magnetic composites, also designated as SMC (Soft Magnetic Composites), can consist of iron powder particles coated with an electrically insulating layer. These SMCs are then formed into the desired shape by powder metallurgy processes.

As already mentioned, the first and the second electromagnetic rotary drive with the first and the second magnetically effective core 31, 32 and the first and the second stator 41, 42 are designed according to the principle of the bearingless motor, in which the respective magnetically effective core 31, 32 is magnetically driven without contact and is magnetically levitated without contact with respect to the respective stator 41, 42, wherein no separate or separable magnetic bearings are provided. The levitation function and the drive function are each realized with the same stator 41 or 42, wherein it is not possible to divide the stator 41 or 42 into a bearing unit and a drive unit. The drive and levitation functions cannot be separated from each other. The term "bearingless motor" has become established for such rotary drives because no separate magnetic bearings or magnetic bearing units are provided for the impeller. These particularly efficient bearingless motors are characterized in particular by their extremely compact design while at the same time realizing the "contactless" concept.

Thus, a bearingless motor is an electromagnetic rotary drive in which the magnetically effective core 31, 32 rotating in the operating state is levitated with respect to the stator 41, 42, wherein no separate magnetic bearings or magnetic bearing units are provided. For this purpose, the respective stator 41, 42 is designed as bearing and drive stator, which is both stator 41, 42 of the electric drive and the stator 41, 42 of the magnetic levitation. The coils 53 of the bearing and drive stator 41, 42 can be used to generate rotary magnetic fields which, on the one hand, exert a torque on the magnetically effective core 31, 32, causing its rotation, and which, on the other hand, exert a freely adjustable transverse force on the magnetically effective core 31, 32, so that its radial position, i.e. its position in the radial plane of the respective stator 41, 42, can be actively controlled or regulated. The basic principle of the bearingless motor is sufficiently known in the meantime to the person skilled in the art, but a special realization of the principle of the bearingless motor is preferred for the cross-flow fan 1 according to an embodiment of the invention, which will be explained in more detail.

In the first embodiment described here, three degrees of freedom of the respective magnetically effective core 31, 32 can be actively controlled or regulated, namely its position in the radial plane (two degrees of freedom) and its rotation about the axial direction A. With respect to its axial deflection in the direction of the desired axis of rotation, the respective magnetically effective core 31, 32 is passively magnetically stabilized or levitated by reluctance forces, i.e., it cannot be controlled. Therefore, the radial levitation of the impeller 2 corresponds to an active magnetic radial bearing in terms of function, and the axial bearing corresponds to a passive axial magnetic bearing in terms of function.

In embodiments with a bearingless motor, in contrast to classical magnetic bearings, the magnetic levitation and drive of the motor is realized by electromagnetic rotating fields. Typically, in the bearingless motor, the magnetic drive and levitation function is generated by the superposition of two magnetic rotating fields, which are usually designated as the drive and control fields. These two rotating fields generated with the windings or coils 5 of the stator 41 or 42 usually have a pole pair number that differs by one. For example, if the drive field has the pole pair number p, the control field has the pole pair number p+1 or p−1. In this case, tangential forces acting on the respective magnetically effective core 31, 32 in the radial plane are generated with the drive field, causing a torque, which causes the rotation about the axial direction A. Due to the superposition of the drive field and the control field, it is also possible to generate a freely adjustable transverse force on the respective magnetically effective core 31, 32 in the radial plane with which the position of the respective magnetically effective core 31, 32 in the radial plane can be regulated. Thus, it is not possible to divide the electromagnetic flux generated by the coils 53 into an (electro-) magnetic flux that only provides for driving the rotation and an (electro-) magnetic flux that only realizes the magnetic levitation.

To generate the drive field and the control field, it is possible on the one hand to use two different winding systems, namely one to generate the drive field and one to generate the control field. The coils for generating the drive field are then usually designated as drive coils and the coils for generating the control field as control coils. The current impressed in these coils is then designated as the drive current or the control current. On the other hand, it is also possible to generate the drive and levitation function with only one single winding system—as in the embodiment described here—so that there is therefore no distinction between drive and control coils. This can be realized in such a way that the values for the drive current and the control current determined in each case by a control device (electronic controller) 6 are added or superimposed by calculation—e.g., with the aid of software—and the resulting total current is impressed into the respective coils 53. In this embodiment, of course, it is no longer possible to distinguish between control and drive coils. In the embodiment described here, the last-mentioned variant is realized, i.e., there is no distinction between drive and control coils in the first and the second stator 41, 42, but there is only one winding system in each case, in the six coils 53 of which the calculated sum of the drive and control currents is impressed. However, it is of course also possible to design the cross-flow fan 1 according to embodiments of the invention with two electromagnetic rotary drives, wherein two separate winding systems are provided in the first stator 41 and in the second stator 42, namely each with separate drive coils and separate control coils.

The particular embodiment of the principle of the bearingless motor, which is preferred for the cross-flow fan 1 according to embodiments of the invention, is explained in more detail below. As already mentioned, only concentrated windings 53 are provided in each of the bearing and drive stator 41 and 42, wherein exactly one concentrated winding 53 is provided on each coil core 5. In contrast to a distributed winding extending over several coil cores, the concentrated winding 53 is provided on exactly one coil core 5.

In contrast to the concept of the bearingless motor with distributed windings, as disclosed, for example, in the aforementioned U.S. Pat. No. 6,404,794, the concept with the concentrated windings 53 proposed here as preferred has the substantial advantage that it enables a significantly increased power density and a much more compact design. With the concept of concentrated windings 53, the number of coil cores 5 or grooves between the coil cores 5 can be drastically reduced, which is also a considerable advantage in terms of manufacturing.

Thus, in the preferred embodiment described here, each stator 41, 42 is designed in each case with concentrated windings 53, wherein each coil core 5 carries exactly one winding (or coil) 53. These are the same concentrated windings 53, which perform both the generation of the levitation force and the torque formation simultaneously. Thus, the concentrated windings 53 represent combined windings for generating, the levitation forces and the torque. This means that there are no separate winding systems for the generation of the levitation forces on the one hand and for the formation of the torque on the other hand. Due to this embodiment, the number of concentrated windings 53 can be significantly reduced.

Figure 6A:
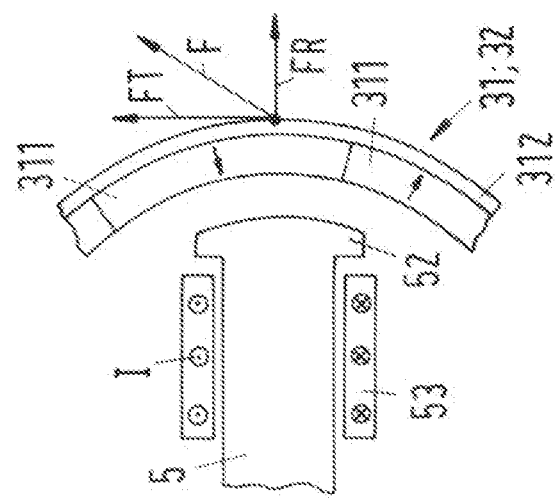
FIGS. 6A-6C are three illustrations explaining the levitation and drive principle.
Figure 6B:
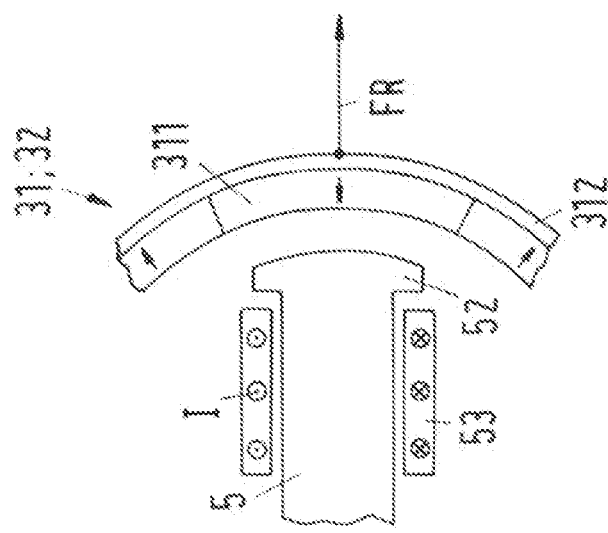
Figure 6C:
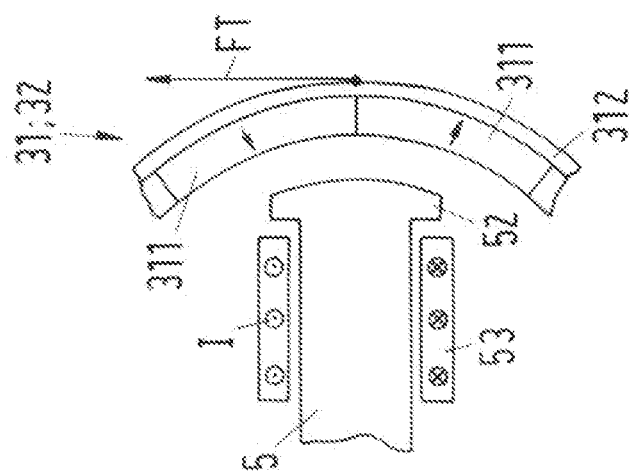

To explain the levitation and drive principle, FIGS. 6A-6C shows in three different illustrations in each case a coil core 5 with the pole shoe 52 and the concentrated winding 53 arranged on the coil core 5, as well as a detail of the first magnetically effective core 31. The three illustrations, each representing snapshots, differ in the relative rotational position in which the first magnetically effective core 31 is located relative to the pole shoe 52. In the illustration on the left, the boundary between two circumferentially adjacent permanent magnets 311, which are polarized in opposite directions and radially, is just centrally opposite the pole shoe 52. In the middle illustration, one of the permanent magnets 311 is centrally located opposite the pole shoe 52. In the illustration on the right, an arbitrary intermediate position is shown in which neither a boundary between two adjacent permanent magnets 311 is exactly opposite the center of the pole shoe 52, nor is one of the permanent magnets 311 in a centered position with respect to the pole shoe 52.

In FIG. 6A, the arrows without reference signs again show the magnetization of the respective permanent magnet 311, and the current lines I show the current through the concentrated winding 53.

In the illustration on the left, the first magnetically effective core 31 is oriented relative to the pole shoe in such a way that the radial force components acting on the two permanent magnets 311 just cancel each other out, i.e., compensate, while the two tangential force components add up so that overall, the force FT directed in the tangential direction acts on the first magnetically effective core 31. In the middle illustration, the resulting force acting on the permanent magnet is the force FR directed in the radial direction. In the general orientation represented in the illustration on the right, a force F acts on the first magnetically effective core 31, which comprises both a tangential force component FT different from zero, which is directed in the tangential direction, and a radial force component FR different from zero, which is directed in the radial direction.

The tangential force component FT causes a torque on the first magnetically effective core 31. A force can be applied to the first magnetically effective core 31 via the radial force component FR to change or regulate its position in the radial plane, wherein—as already mentioned—the radial plane represents the x-y plane of a Cartesian coordinate system in the first stator 41, the z-axis of which extends in the axial direction A.

The rotational position in which the first magnetically effective core 31 is located relative to the pole shoe 52 can be described by an angle of rotation. As FIG. 6A shows, there are angles of rotation for each coil core 5 or pole shoe 52 at which no radial force component FR or no tangential force component FT can be generated. The direction of the force effect of a pole shoe 52 on the first magnetically effective core 31, i.e., the direction of the force F in FIG. 6B, can also be selected not freely, but depends on the angle of rotation. Since torques can only be generated by tangential force components FT, there are angles of rotation at which a given pole shoe 52 cannot contribute to the torque (see, for example, the middle illustration in FIG. 6C). Therefore, several pole shoes 52 should be involved in torque formation.

The same applies to the generation of a levitation force acting on the first magnetically effective core 31, which generally includes an x-component and a y-component in the radial plane. For each pole shoe 52 there are angles of rotation at which, for example, it is not possible to generate a force with a x-component different from zero. To generate a levitation force of a predetermined magnitude and direction, the interaction of a plurality of pole shoes 52 is required.

Therefore, for the first electromagnetic rotary drive (and of course also for the second electromagnetic rotary drive, if present), such embodiments are preferred in which a torque as well as a levitation force with freely selectable direction and strength can be generated for each angle of rotation, i.e. for each rotational position of the first magnetically effective core 31 relative to the first stator 41. Due to this measure, a stable rotational speed and position control can be achieved.

One possible embodiment meeting this requirement is the embodiment represented in FIG. 4, in which the first magnetically effective core 31 comprises the exactly four permanent magnets 311, and the first stator 41 comprises the exactly six coil cores 5 with the exactly six pole shoes 52, wherein exactly one concentrated winding 53 is arranged on each coil core 5.

Figure 7:
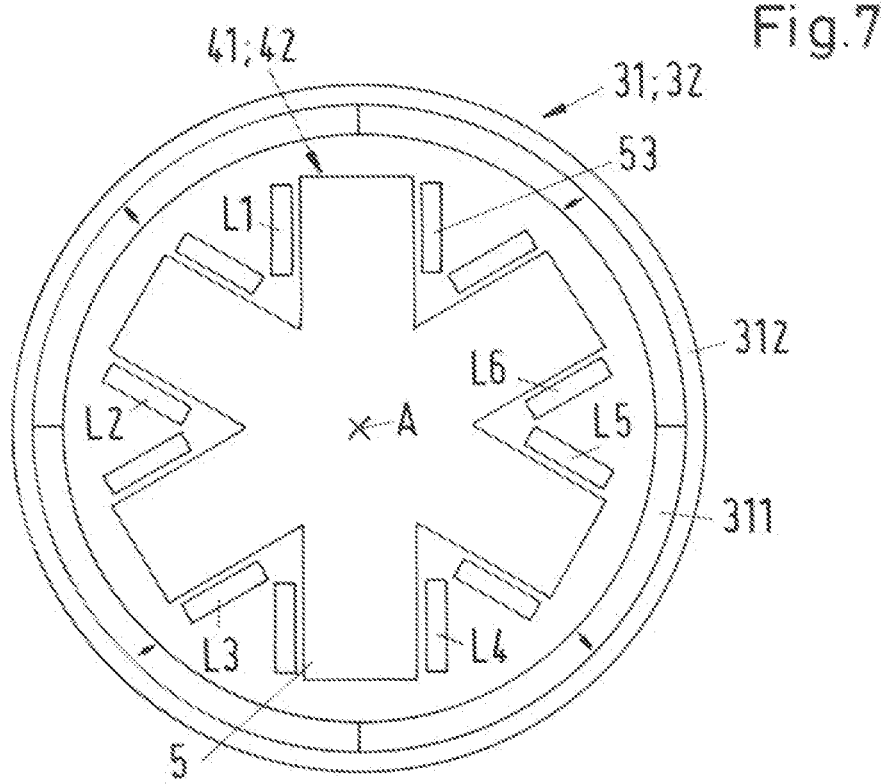
FIG. 7 is a schematic sectional representation of the first or the second electromagnetic rotary drive in a section perpendicular to the axial direction A.

This arrangement is shown again schematically in FIG. 7, whereby an explicit representation of the pole shoes 52 has been omitted for reasons of a better overview. The sheath 313 is also not represented in FIG. 7. The six concentrated windings 53 which are carried by the six coil cores 5 of the first stator 41 are designated by the reference signs L1 to L6 in FIG. 7 for distinguishability, i.e., each of the windings designated by L1 to L6 in FIG. 7 is one of the concentrated windings 53. The currents which are fed into the respective concentrated winding L1 to L6 are designated by i1 to i6. This means that i1 designates the current fed into the concentrated winding L1, i2 designates the current injected into the concentrated winding L2, and so on. Each concentrated winding L1-L6 forms an electrical phase.

In the embodiment represented in FIG. 7, a control is possible in which for any angle of rotation, i.e., for any rotational position of the first magnetically effective core 31 relative to the first stator 41, a levitation force of any direction and magnitude, as well as a constant torque of any magnitude, can be generated.

To control the concentrated windings L1-L6, the power electronics provided in the control device 6 comprises, for example, six half-bridges, namely one for each concentrated winding L1-L6. Since two circuit breakers are required for each half-bridge, a total of twelve circuit breakers are provided for each electromagnetic rotary drive. Preferably, three of each of the concentrated windings L1-L6 are connected together to form a three-phase system with a floating star point. For example, the concentrated windings L1, L3, and L5 are connected together to form a three-phase system, and the concentrated windings L2, L4, and L6 are connected together to form a three-phase system.

The currents i1 to i6 are preferably regulated according to the following scheme. A drive desired current $\hat{I}_D$ is predetermined by a speed control algorithm. This, together with an angle of rotation θ describing the rotational position of the first magnetically effective core 31 relative to the first stator 41, is converted to a stator-oriented three-phase system having the following components: $i_{D,1} = \hat{I}_D \cdot \cos(\theta)$ $$i_{D,2} = \hat{I}_D \cdot \cos\left(\theta - \frac{2}{3}\pi\right)$$

$$i_{D,3} = \hat{I}_D \cdot \cos\left(\theta + \frac{2}{3}\pi\right)$$

In the same way, the levitation current $\hat{I}_B$, which is required for the active magnetic levitation of the magnetically effective core 31, and the levitation force direction $\varphi_B$, which are predetermined by a position control algorithm, are converted to a stator-oriented three-phase system:

$$i_{B,1} = \hat{I}_B \cdot \sin(\theta + \varphi_B)$$

$$i_{B,2} = \hat{I}_B \cdot \sin\left(\theta - \frac{2}{3}\pi + \varphi_B\right)$$

$$i_{B,3} = \hat{I}_B \cdot \sin\left(\theta + \frac{2}{3}\pi + \varphi_B\right)$$

Since the concentrated windings 53, namely L1 to L6, generate both the levitation force required for the magnetic levitation and the torque required for the drive, the levitation and drive currents must be superimposed, resulting in the following currents i1-i6 for the concentrated windings L1-L6, which are fed into the respective concentrated winding L1-L6.

$i_1 = i_{D,1} + i_{B,1}$ $i_2 = i_{D,2} - i_{B,3}$ $i_3 = i_{D,3} + i_{B,2}$ $i_4 = i_{D,1} - i_{B,1}$ $i_5 = i_{D,2} + i_{B,3}$ $i_6 = i_{D,3} - i_{B,2}$

Due to this control, the desired levitation force, the direction of which is defined by $\varphi_B$, and the desired torque are then generated at the current angle of rotation θ.

Apart from the embodiment described here, in which the first or second stator 41 or 42 comprises in each case exactly six coil cores 5, each of which carries exactly one concentrated winding 53, or L1 to L6, and in which the first or second magnetically effective core 31 or 32 is further designed in each case with four permanent magnets 311, so that the first or second magnetically effective core 31 or 32 has in each case the pole pair number two, there are also other variants, some of the preferred ones are illustrated in a schematic representation in the FIG. 8 to FIG. 12. The representations in FIG. 8 to FIG. 12 correspond in each case to those in FIG. 7, i.e., the sheath 313 is also not represented in FIG. 8 to FIG. 12. All variants can be used for the first electromagnetic rotary drive with the first stator 41 and the first magnetically effective core 31, as well as for the second electromagnetic rotary drive with the second stator 42 and the second magnetic core 32. If an electromagnetic rotary drive is provided at each end 21, 22, of the impeller 2, this first electromagnetic rotary drive and the second electromagnetic rotary drive are preferably designed in the same way at least with respect to the first and second stator 41 and the first and second magnetically effective core 31 and 32.

Furthermore, all variants in FIGS. 8 to 12 have in common that in each case exactly one concentrated winding 53 is provided on each coil core 5, that each permanent magnet 311 is in each case designed as a ring segment, that the permanent magnets 311 of each magnetically effective core 31 or 32 in each case complement each other to form a ring, and that each permanent magnet 311 is magnetized in the radial direction, wherein permanent magnets 311 arranged adjacent to each other in the circumferential direction are each oppositely magnetized. The respective magnetization is again represented by the arrows without reference signs. In addition, for each magnetically effective core 31 or 32, all permanent magnets 311 of this magnetically effective core 31 or 32 are designed to have the same length as viewed in the circumferential direction of the respective magnetic core 31 or 32.

Figure 8:
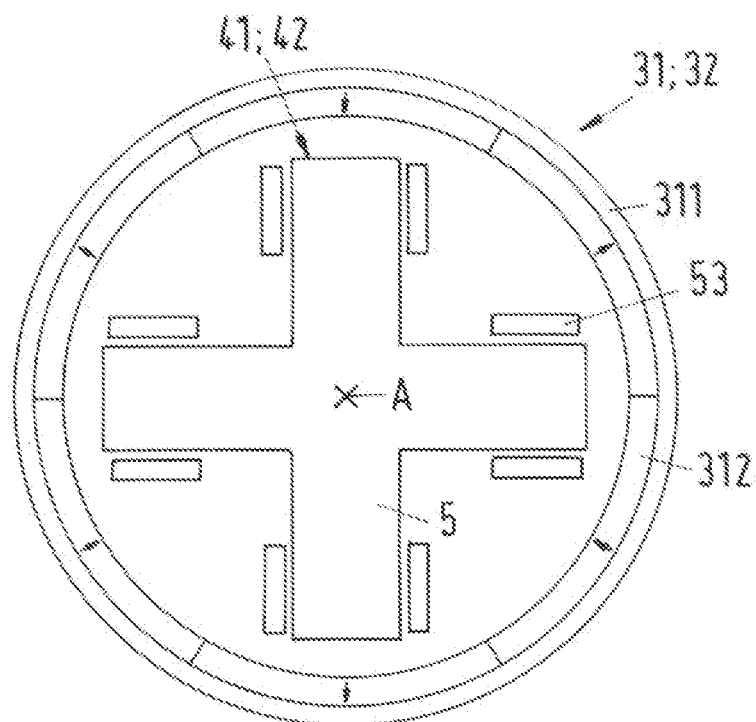
FIGS. 8-12 are as FIG. 7, but for different variants of the embodiment of the first or the second electromagnetic rotary drive.

FIG. 8 shows a variant in which the first or second magnetically effective core 31 or 32 comprises six permanent magnets 311 and is designed with six poles, i.e., with the pole pair number three. The first or second stator 41 or 42 is designed with exactly four coil cores 5, wherein exactly one concentrated winding 53 is arranged on each coil core 5.

Figure 9:
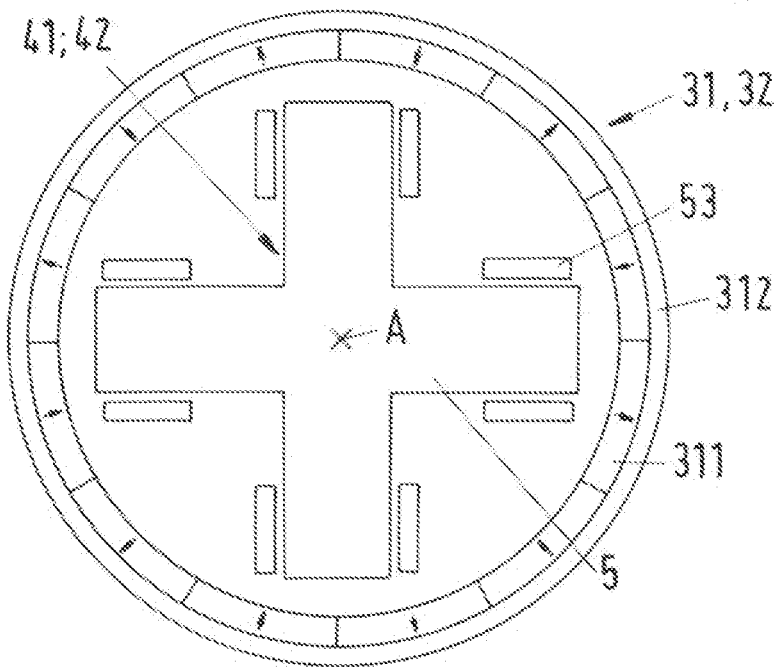

FIG. 9 shows a variant in which the first or second magnetically effective core 31 or 32 comprises twelve permanent magnets 311 and is designed with twelve poles, i.e., with the pole pair number six. The first or second stator 41 or 42 is designed with exactly four coil cores 5, wherein exactly one concentrated winding 53 is arranged on each coil core 5.

Figure 10:
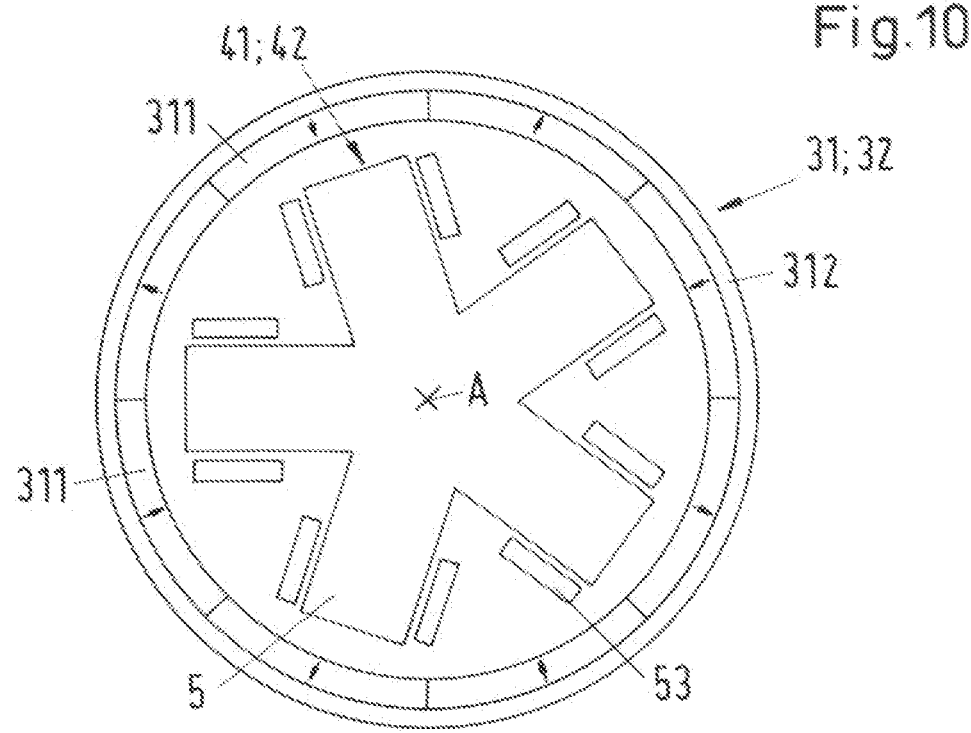

FIG. 10 shows a variant in which the first or second magnetically effective core 31 or 32 comprises eight permanent magnets 311 and is designed with eight poles, i.e., with the pair pole number four. The first or second stator 41 or 42 is designed with exactly five coil cores 5, wherein exactly one concentrated winding 53 is arranged on each coil core 5.

Figure 11:
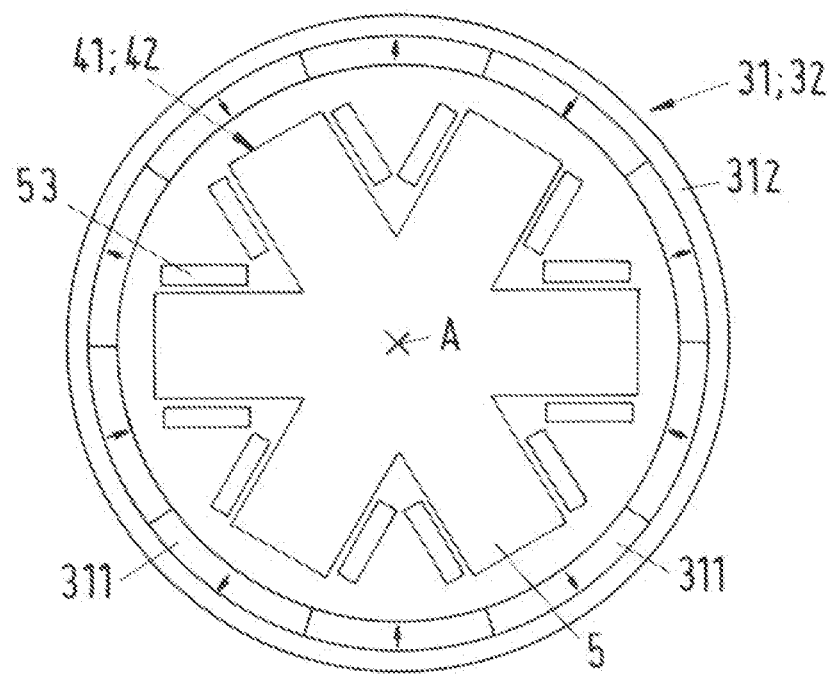

FIG. 11 shows a variant in which the first or second magnetically effective core 31 or 32 comprises ten permanent magnets 311 and is designed with ten poles, i.e., with the pair pole number five. The first or second stator 41 or 42 is designed with exactly six coil cores 5, wherein exactly one concentrated winding 53 is arranged on each coil core 5.

Figure 12:
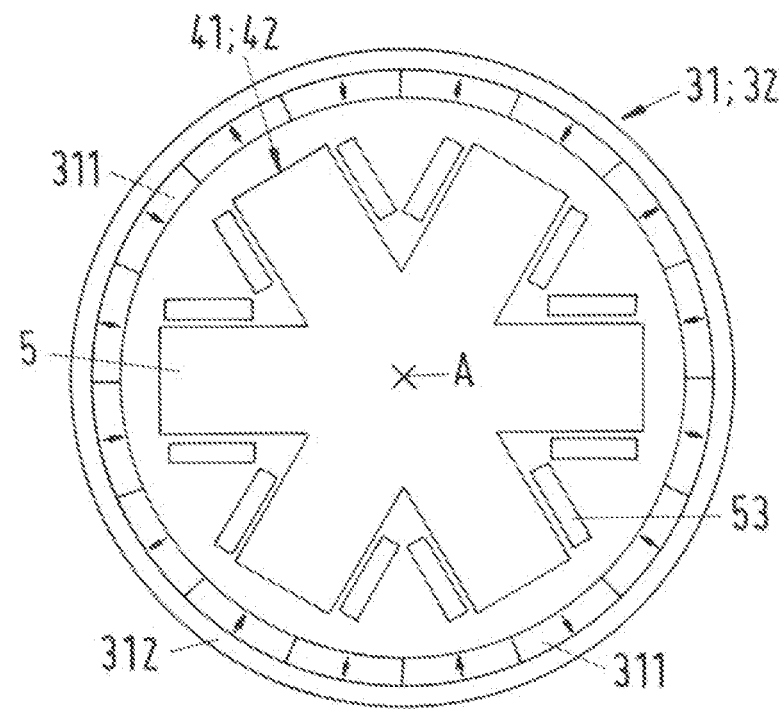

FIG. 12 shows a variant in which the first or second magnetically effective core 31 or 32 comprises sixteen permanent magnets 311 and is designed with sixteen poles, i.e., with the pair pole number eight. The first or second stator 41 or 42 is designed with exactly six coil cores 5, wherein exactly one concentrated winding 53 is arranged on each coil core 5.

The sensor system, e.g., for determining the position of the magnetically effective core 31, 32, the control, the supply and the regulation of the rotary drive designed as a bearingless motor are sufficiently known to the person skilled in the art and require no further explanation here. Some sensors 7 are drawn in FIG. 4 with an exemplary character.

In the first embodiment of the cross-flow fan 1 according to the invention, preferably not only the first and the second magnetically effective core 31, 32 are completely enclosed by the respective sheath 313, but also the first stator 41 and the second stator 42 are encapsulated in a first stator housing 91 and in a second stator housing 92, respectively, wherein each stator housing 91, 92 includes a low-permeable material. Preferably, this low-permeable material is a plastic or a ceramic or a metallic material, in particular a corrosion-resistant metal alloy with poor electrical conductivity such as a titanium-aluminum alloy, in particular Ti6Al-4V/Ti6 or a nickel-chromium-molybdenum alloy.

Preferably, the sheaths 313 of the magnetically effective cores 31, 32 and the stator housings 91, 92 are made of a plastic or of a ceramic or a ceramic material or of a metal or of a corrosion-resistant metal alloy with poor electrical conductivity such as, for example, a titanium-aluminum alloy, in particular Ti6Al-4V/Ti6, or a nickel-chromium-molybdenum alloy. If the sheaths 313 and/or the stator housings are made of a metallic material, this metallic material is preferably one that has low electrical conductivity, in particular to keep eddy current losses in the sheaths 313 and the stator housings 91, 92 small as a result. In particular, it is also possible that the sheaths 313 and the stator housings 91, 92 are made of different materials. Thus, for example, the sheaths 313 can be made of a first plastic or a first ceramic material or a first metallic material, while the stator housings 91, 92 are made of a second plastic or a second ceramic material or a second metallic material. In this embodiment, the first and second plastic can be the same plastic, or the first and second plastic can be different plastics. The first and second ceramic materials can also be identical or different, and the first and second metallic materials can be identical or different. Among the metallic materials, such metal alloys that are corrosion-resistant and have low electrical conductivity are particularly preferred.

A low-permeable material is one that has only a low magnetic permeability (magnetic conductivity). Within the framework of this application, materials whose permeability number (relative permeability) deviates only slightly or not at all from 1 (permeability number of the vacuum) are understood to be low-permeable—as is generally the case. In any case, a low-permeable material has a permeability number that is less than 1.1. Therefore, the low-permeable material has a significantly lower magnetic conductivity than, for example, the ferromagnetic material from which the coil cores 5 are made. The first and/or the second plastic can be, for example, one of the following plastics: Polyethylene (PE), Low Density Polyethylene (LDPE), Ultra Low Density Polyethylene (ULDPE), Ethylene Vinyl Acetate (EVA), Polyethylene Terephthalate (PET), Polyvinyl Chloride (PVC), Polypropylene (PP), Polyurethane (PU), Polyvinylidene Fluoride (PVDF), Acrylonitrile Butadiene Styrene (ABS), Polyacryl, Polycarbonates (PC), or Silicones. For many applications, the materials known under the brand name Teflon, polytetrafluoroethylene (PTFE) and perfluoroalkoxy polymers (PFA), are also suitable as first and/or second plastic.

Preferably, one of these plastics is used as a first plastic to hermetically encapsulate the magnetically effective cores 31, 32, and one of these plastics is used as a second plastic for the stator housings to hermetically encapsulate the stators 41, 42. Since it is sufficient for understanding, no further distinction will be made between the first and the second plastic in the following.

It is also possible that each vane 8 of the impeller 2 is encapsulated and completely enclosed, preferably hermetically. However, it is also possible to manufacture the vanes 8 from a particularly resistant material, for example from a metallic material or a plastic.

Since all the aforementioned plastics or metallic or ceramic materials are low-permeable, i.e., they conduct the magnetic flux poorly, the sheaths 313 and stator housing 91 or 92 arranged in the radial direction between the first or second magnetically effective core 31, 32 on the one hand and the pole shoes 52 of the coil cores 5 of the first or second stator 41, 42 on the other hand are to be attributed to the magnetic air gap between the magnetically effective core 31 or 32 and the stator 41 or 42. The magnetic air gap between the magnetically effective core 31 or 32 and the stator 41 or 42 is thus equal to the distance in the radial direction between the magnetically effective core 31 or 32 and the pole shoes 52 of the coil cores 5 of the stator 41 or 42. Therefore, the hermetic encapsulation of the magnetically effective cores 31, 32 and the hermetic encapsulation of the stators 41, 42 cause a magnetic air gap that is large compared to other bearingless motors. When the magnetically effective core 31, 32 is centered, the width of the magnetic air gap is, for example, 4 mm or even more.

The two stator housings 91 and 92 are designed at least substantially identically. Therefore, only the first stator housing 91 is referred to in the following, whereby the explanations apply in the same or in the analogously same way to the second stator housing 92.

The first stator housing 91 comprises a first housing portion 93 and a second housing portion 94 which are arranged adjacent with respect to the axial direction A, wherein the first housing portion 93 is arranged within the impeller 2 and the second housing portion 94 is arranged outside the impeller 2. Each housing portion 93, 94 has a cylindrical shape, wherein the outer diameter of the second housing portion 94 is larger than the outer diameter of the first housing portion 93. Overall, the first stator housing 91 thus encloses a space that is created when one rotates an L around the long limb.

The outer diameter of the first housing portion 93 is smaller than the inner diameter of the first magnetically effective core 31 of the impeller 2, so that the first housing portion 93 can be inserted into the impeller 2 in the axial direction A. The first stator 41 of the first electromagnetic rotary drive is arranged in the first housing portion 93 of the first stator housing 91, so that the first stator 41 is surrounded by the first magnetically effective core 31 of the impeller 2 when the first stator housing 91 is inserted into the impeller 2. As a result, the arrangement of a rotary drive is usual for an external rotor, in which the first stator 41 is arranged radially inwardly in the first magnetically effective core 31.

The outer diameter of the second housing portion 94 of the first stator housing 91 is dimensioned such that it is at least as large as the outer diameter of the first magnetically effective core 31, so that the second housing portion 94 cannot be inserted into the impeller 2. Then, for example, the second housing portion 94 can abut the fan housing 10 (FIG. 3), which forms a stop for the second housing portion 94 so that the first stator housing 91 is in a well-defined position.

The control device 6 for the first stator 41 is arranged in the second housing portion 94 of the first stator housing 91. In an analogous manner, a control device 6 for the second stator 42 is provided in the second housing portion 94 of the second stator housing 92. The two control devices 6 for the first stator 41 or for the second stator 42 can operate independently of each other. Thus, for example, the control device 6 for the first stator 41 regulates the radial position of the first magnetically effective core 31 relative to the first stator 41, and independently, the control device 6 for the second stator 42 can regulate the radial position of the second magnetically effective core 32 relative to the second stator 42. The cross-flow fan 1 is driven and regulated by the two control devices 6. Each control device 6 comprises the power electronics, with which the current for the coils 53 of the respective stator 41 or 42 is generated, as well as a regulating and control device, with which the drive of the impeller 2 and the radial position of the respective magnetically effective core 31, 32 is regulated or controlled. The power electronics are preferably designed as a printed circuit board (PCB). Furthermore, the control device 6 can comprise various sensors 7 as well as an evaluation unit for processing the signals supplied by the sensors 7. The fact that the entire control device 6 is also arranged in the respective stator housing 41 or 42, results in an extremely compact and space-saving design of the cross-flow fan 1. In addition, the control device 6 is also protected against chemically aggressive ambient conditions as well as against dust and contamination in the hermetically sealed stator housing 41 or 42.

Furthermore, a feedthrough 95 for a cable is provided on each stator housing 91, 92, via which the control device 6 is supplied with power. Furthermore, the cable can be used for the transmission of analog or digital signals into the control device 6 or out of the control device 6. For this purpose, the cable of each control device 6 is connected, for example, to a voltage source and to a communication interface.

Since both the first and the second magnetically effective core 31, 32 as well as the first and the second stator 41, 42 and the two control devices 6 are thus hermetically encapsulated, the cross-flow fan 1 is perfectly suited for use in problematic environments such as those found in the semiconductor industry. Here, corrosive vapors, gases or even corrosive substances may be present, which can significantly damage conventional cross-flow fans after only a short period of operating time. In particular, the cross-flow fan 1 according to embodiments of the invention is suitable for use in excimer lasers and in laser technology in general. Due to the bearingless concept as well as the hermetic encapsulation of the stators 41, 42, the control devices 6 and the magnetically effective cores 31, 32, the cross-flow fan 1 is also particularly suitable for use in high-purity environments or for conveying high-purity gases, for example in the pharmaceutical industry or in biotechnology.

To arrange the control device 6 in each case in one of the second housing portions 94 further has the advantage of a spatial separation between the stator 41, 42 arranged in the first housing portion 93 and the control device 6 arranged in the second housing portion 94. Due to the spatial separation, the control device 6 is much less exposed to the heat generated by the stator 41, 42. This heat is generated, for example, by the operation of the rotary drive, in particular by the current flow through the coils 53 of the stator 41, 42, by eddy current losses and by hysteresis losses. It is also possible that heat is introduced into the first housing portion 93 of the stator housing 91, 92 by the fluid to be conveyed. For example, in an excimer laser, the temperature of the gas to be conveyed can be up to 200° C. or even more. Since, as a rule, the electromagnetic rotary drive and, in particular, the stator 41, 42 can be exposed to higher temperatures than the control device 6 with its electronic components, the spatial spacing of stator 41, 42 and the control device 6 is particularly advantageous.

In particular, to better protect the control device 6 from an excessive heating, it can be advantageous to provide a thermal protection layer 96 (FIG. 3) in each stator housing 91, 92, which is arranged between the stator 41, 42 and the control device 6.

As a further advantageous measure, it is possible to design each stator 41, 42 to be coolable. For example, this can be realized by providing cooling lines 97 (FIG. 4) between the coil cores 5, i.e., where the coils 53 also run, through which a fluid heat transfer medium, for example water or air, is circulated, which at least partially absorbs and removes the heat generated by the coils 53 or other heat. The heat transfer medium can be supplied and removed through the feedthrough 95. Of course, the first and second stator housings 91, 92 can also be cooled from the outside.

A further advantage of the cross-flow fan 1 according to the invention is that the impeller 2 can be designed without a shaft. The shaft provided in known cross-flow fans, which extends through the impeller in the axial direction and is arranged centrally in the middle of the impeller, whereby the shaft emerges from the impeller at both axial ends and projecting beyond it with respect to the axial direction, is no longer necessary in the cross-flow fan 1 according to the invention, so that such a shaft can be dispensed with. This means a significant simplification, in particular in terms of structural design, and provides additional free space inside the impeller 2.

Figure 13:
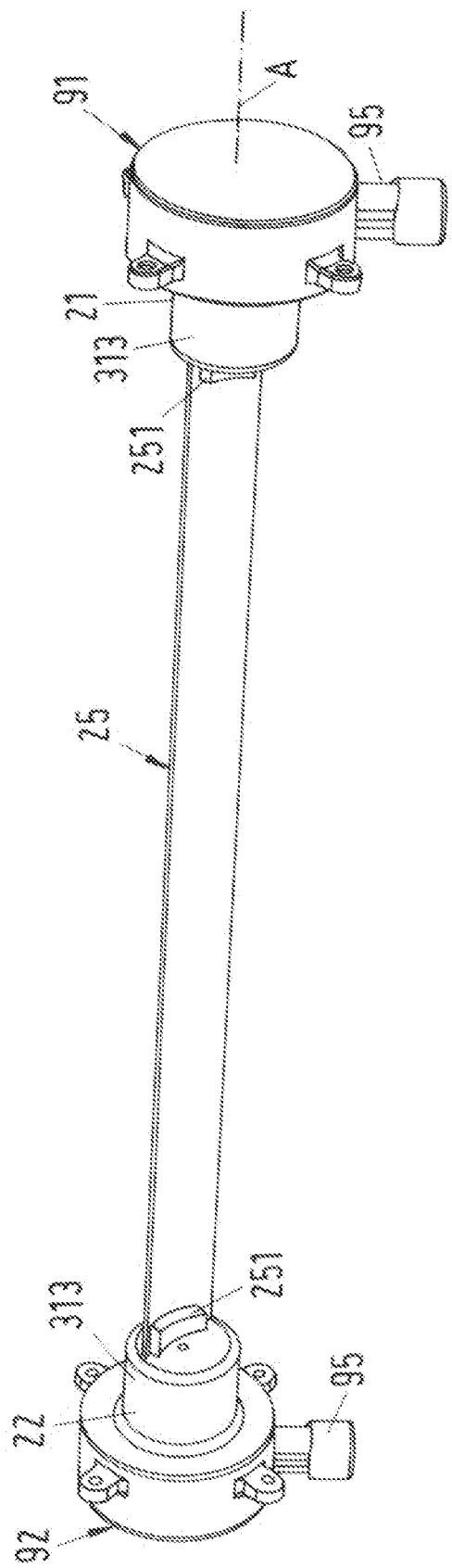
FIG. 13 is a variant of the first embodiment in a perspective representation.

The absence of a shaft inside the impeller 2 further has the advantage that one or more flow guide elements can be arranged inside the impeller 2 in a very simple way to guide the fluid flow. Such variant is shown in FIG. 13. The representation in FIG. 13 corresponds substantially to the representation in FIG. 1. FIG. 13 shows a perspective representation of a variant of the first embodiment, whereby the impeller 2 is not shown in FIG. 13 for a better understanding. In this variant, a baffle plate 25 is provided inside the impeller 2, which extends in the axial direction A from the first stator housing 91 to the second stator housing 92. The baffle plate 25 is fixed to the respective stator housing 91, 92 in each case by a detachable connecting element 251. The connection to the respective stator housing 91 or 92 is preferably easily detachable, so that the baffle plate 25 can be inserted or removed in a simple manner. For this purpose, each connecting element 251 can be designed, for example, in such a way that it can engage in a recess in the respective stator housing 91, 92.

Figure 14:
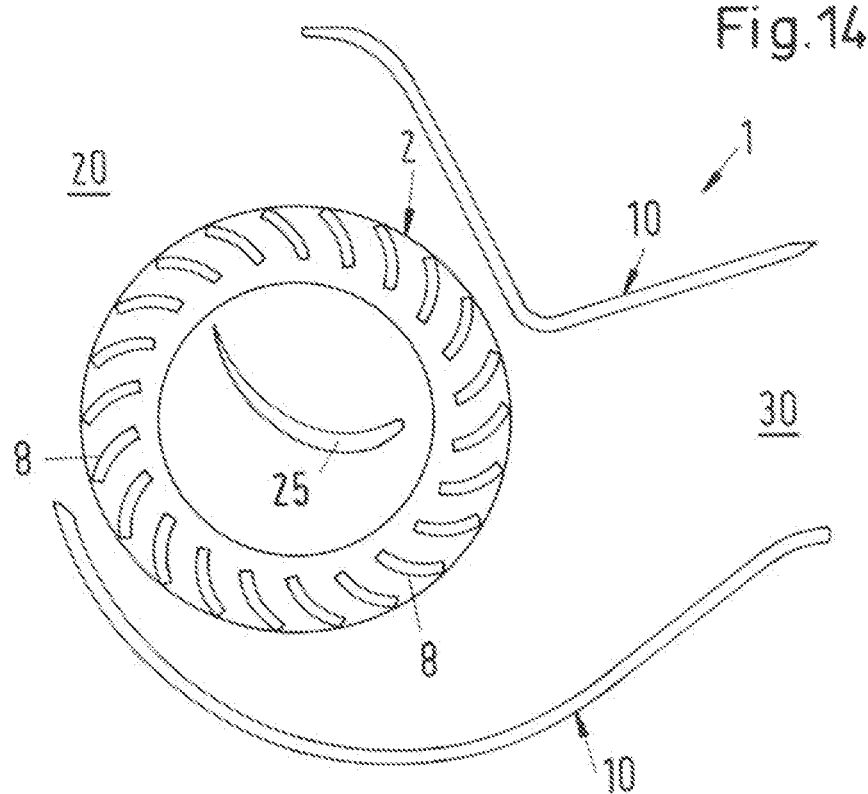
FIG. 14 is a sectional representation of the variant from FIG. 13 in a section through the impeller perpendicular to the axial direction.

For a better understanding, FIG. 14 still shows a cross-section through this variant with the baffle plate 25 in a section perpendicular to the axial direction A. In FIG. 14, the impeller 2 is represented with the baffle plate 25 arranged inside it. Furthermore, the fan housing 10 is also represented, as well as the intake area 20 through which the fluid to be conveyed is aspirated into the interior of the impeller 2 over the entire length of the impeller 2, and the discharge area 30 through which the fluid to be conveyed is discharged from the interior of the impeller 2 over the entire length of the impeller 2. As can be seen in FIG. 14, the baffle 25 is designed in a curved manner perpendicular to the axial direction A in order to redirect the fluid flow as smoothly as possible from the inside of the impeller 2 into the discharge area 30.

Figure 15:
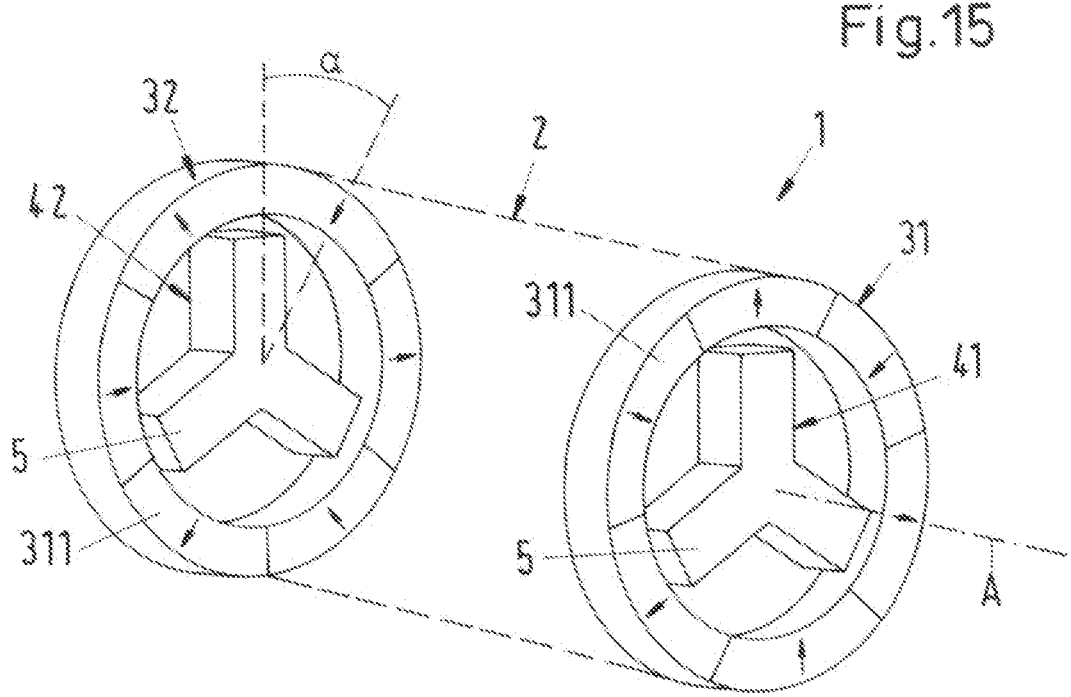
FIG. 15 is a schematic representation of a second embodiment of a cross-flow fan according to the invention.

In a schematic representation, FIG. 15 illustrates a second embodiment of a cross-flow fan 1 according to the invention. In the following description of the second embodiment, only the differences from the first embodiment and its variants will be discussed in more detail. Otherwise, the explanations with respect to the first embodiment and its variants apply in the same way or in analogously the same way to the second embodiment. In the second embodiment, the same parts or parts equivalent in function are designated with the same reference signs as in the first embodiment.

In the second embodiment, both the first stator 41 and the second stator 42 are also designed in each case as bearing and drive stator, wherein the first stator 41 interacts with the first magnetically effective core 31 as an electromagnetic rotary drive which operates according to the principle of the bearingless motor, and wherein the second stator 42 can interact with the second magnetically effective core 32 as an electromagnetic rotary drive Which operates according to the principle of the bearingless motor.

Both electromagnetic rotary drives are designed with a particularly space-saving design in the respective stator 41, 42. Each stator 41, 42 comprises only exactly three coil cores 5 in each case, with exactly one concentrated winding 53 (FIGS. 16A-D) being provided on each coil core 5, so that each stator 41, 42 comprises exactly three concentrated windings 53. For reasons of better overview, the concentrated windings 53 are not shown in FIG. 15. Furthermore, the impeller 2 is only indicated in FIG. 15.

For reasons of better overview and because it is sufficient for understanding, the sheaths 313 and the annular magnetic refluxes 312 of the two magnetically effective cores 31, 32, as well as the two stator housings 91, 92 are not shown in FIG. 15.

In the second embodiment, six permanent magnets 311 are provided in each case in the first magnetically effective core 31 and the second magnetically effective core 32, which complement each other as a whole to form a ring. Viewed in the circumferential direction, all six permanent magnets 311 are of equal length. Each permanent magnet 311 is magnetized in the radial direction, as shown by the arrows without reference signs in FIG. 15 and FIGS. 16A-D. In this case, permanent magnets 311 adjacent in the circumferential direction are polarized in opposite directions in each case, i.e., a permanent magnet 311 polarized inward in the radial direction and a permanent magnet 311 polarized outward in the radial direction are adjacent in each case. The first magnetically effective core 31 and the second magnetically effective core 32 are thus each designed with six poles, i.e., with the pole pair number three.

As can be seen in particular in FIG. 15, in the second embodiment the otherwise identically designed magnetic cores 31 and 32 are arranged on the impeller 2 rotated relative to each other by an angle α different from zero. This angle α corresponds to half the length of a permanent magnet 311 measured in the circumferential direction, so it is given by the quotient of 360° and twice the number of permanent magnets 311. In the present embodiment, the angle α is therefore 30°.

For a better understanding of the levitation and drive principle, FIGS. 16A-D show the first stator 41 and the first magnetically effective core 31 in four different illustrations 16A, 16B, 16C, 16D (the same applies, of course, to the second stator 42 and the second magnetically effective core 32). The four illustrations, each representing snapshots, differ in the relative rotational position in which the first magnetically effective core 31 is located relative to the first stator 41. The current flow through the respective concentrated winding 53 is indicated by the dot and cross symbols in the respective concentrated winding 53. A doubling of these symbols in one of the concentrated windings 53 (see FIG. 16B) symbolizes a stronger current in this concentrated winding 53 than in those with only single symbols present. An absence of the symbols (see FIG. 16D) means that no current is flowing in this concentrated winding 53 at the moment.

Figure 16A:
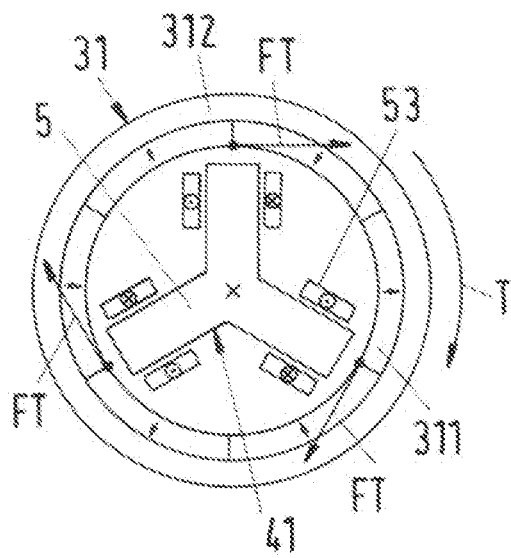
FIGS. 16A-D are four illustrations for explaining the levitation and drive principle of the second embodiment.
Figure 16B:
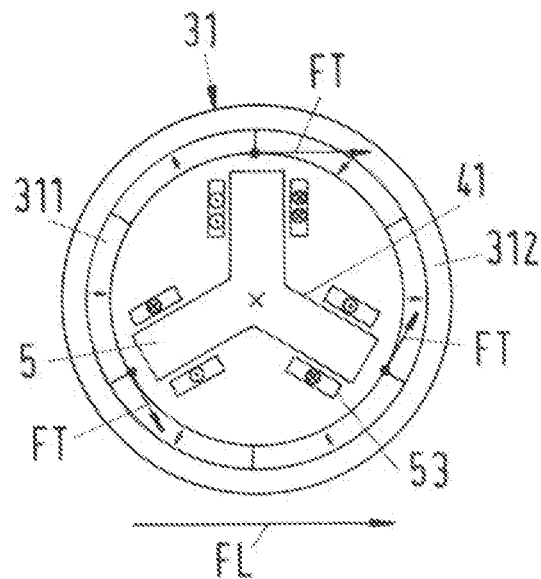

For example, for the generation of torque, all three concentrated windings 53 are applied with an equal amount of current in the same winding direction, as shown in the FIG. 16A. Then, the torque T results from the forces FT, which drives the rotation of the first magnetically effective core 31. To form the levitation force FL, the direction and magnitude of the current for each concentrated winding 53 must be adjusted such that the desired overall direction and the desired magnitude of the bearing force result. This is exemplified in the FIGS. B and D, where in one case a stronger current flows through one of the three concentrated windings 53 than through the other two concentrated windings 53 (FIG. B), and in the other case no current flows through one of the concentrated windings 53 (FIG. D).

Since the levitation force FL can arise from both tangential FT and radial forces FR, it is possible to generate a bearing force FL of any magnitude and direction for any relative rotational position between the first stator 41 and the first magnetically effective core 31.

Figure 16C:
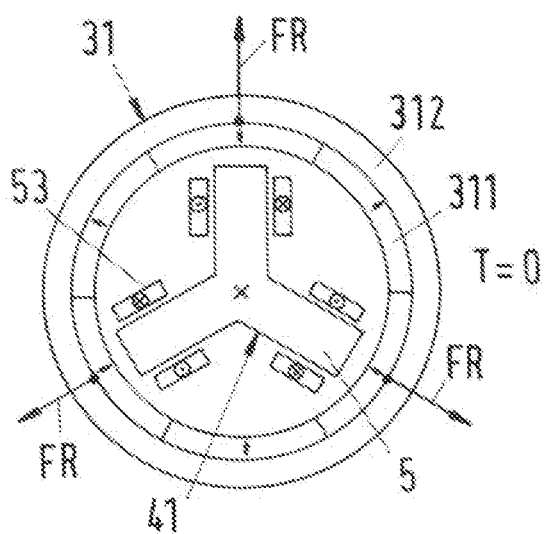
Figure 16D:
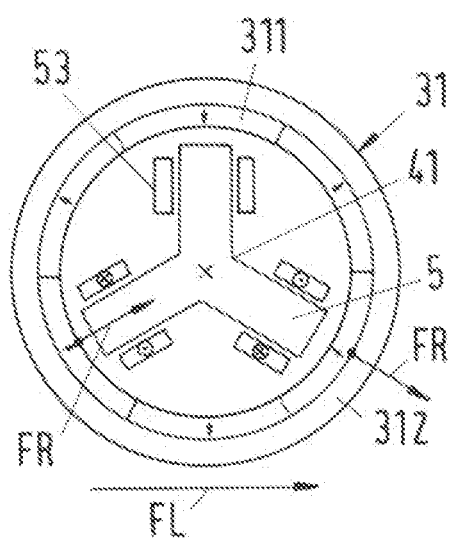

However, it can also be seen that there are relative rotational positions between the first magnetically effective core 31 and the first stator 41 in which it is not possible to generate a torque T acting on the first magnetically effective core 31, as is the case, for example, in FIG. 16C.

Thus, the first electromagnetic rotary drive has a full levitation functionality with respect to the contactless magnetic levitation, but with respect to the drive there are detent positions where the relative rotational position of the first magnetically effective core 31 to the first stator 41 is such that no torque T acting on the first magnetically effective core 31 can be generated with the first stator 41. It would then not be possible to start the first electromagnetic rotary drive from such a detent position.

For this reason, the second magnetically effective core 32 is arranged on the impeller 2 rotated by the angle α different from zero (here 30°) with respect to the first magnetically effective core 31. Since the first magnetically effective core 31 and the second magnetically effective core 32 are connected to each other in a torque-proof manner via the impeller 2, it is not possible that the first magnetically effective core 31 and the second magnetically effective core 32 are simultaneously in a rotational position with respect to their stator 41 or 42 in which no torque can be exerted on the respective magnetically effective core 31 or 32. Due to the relatively twisted arrangement of the first and second magnetically effective core 31, 32, at least one of the two magnetically effective cores 31, 32 is always in a rotational position with respect to the associated stator 41, 42, in which a torque T different from zero can be exerted on it, so that the impeller 2 of the cross-flow fan 1 can start from any rotational position. The two stators 41 and 42 are mounted unrotated relative to each other.

Of course, it is also possible not to rotate the two magnetically effective cores 31, 32 with respect to each other, i.e., to select the angle α equal to zero, and to arrange the two stators 41, 42 rotated relative to each other by the angle of 30° (with respect to a rotation about the axial direction A).

In addition to the small space requirement, the second embodiment has the further advantage that the control and regulation of the two electromagnetic rotary drives can each be realized very simply and with little effort. Only four half-bridges are required for each of the two electromagnetic rotary drives. In each of the two stators 41, 42, each of the three concentrated windings 53 represents one phase in each case. These three phases are connected together in a loadable star point so that in each of the stators 41, 42 the current in each concentrated winding 53 can be adjusted or regulated independently of the currents in the other two concentrated windings 53 of the same stator 41 or 42. The current flowing into (or out of) the star point is also regulated. Thus, four currents are to be regulated in each electromagnetic rotary drive, for which four half-bridges are required. Thus, eight circuit breakers are required for each electromagnetic rotary drive.

Figure 17:
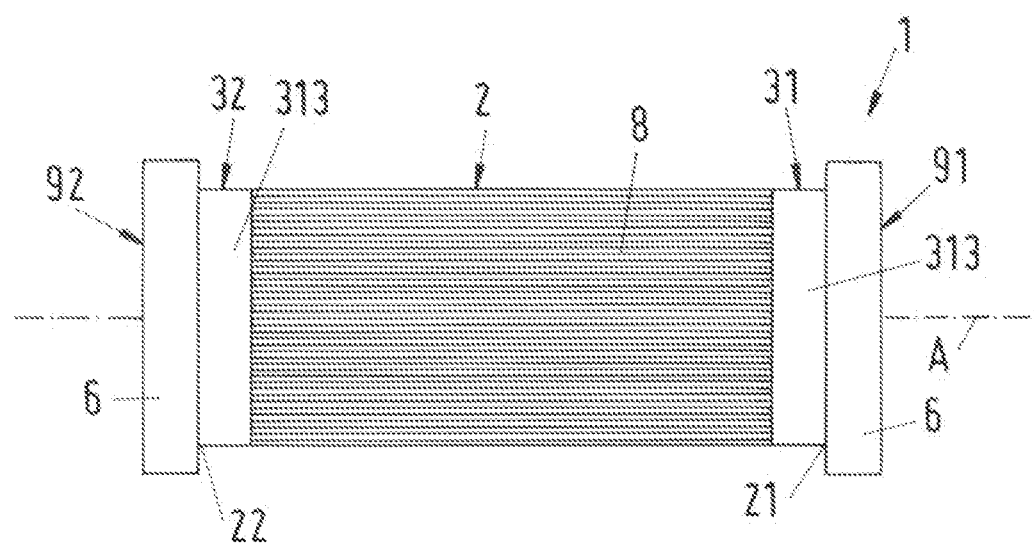
FIG. 17 is a schematic representation of a third embodiment of a cross-flow fan according to the invention.
Figure 18:
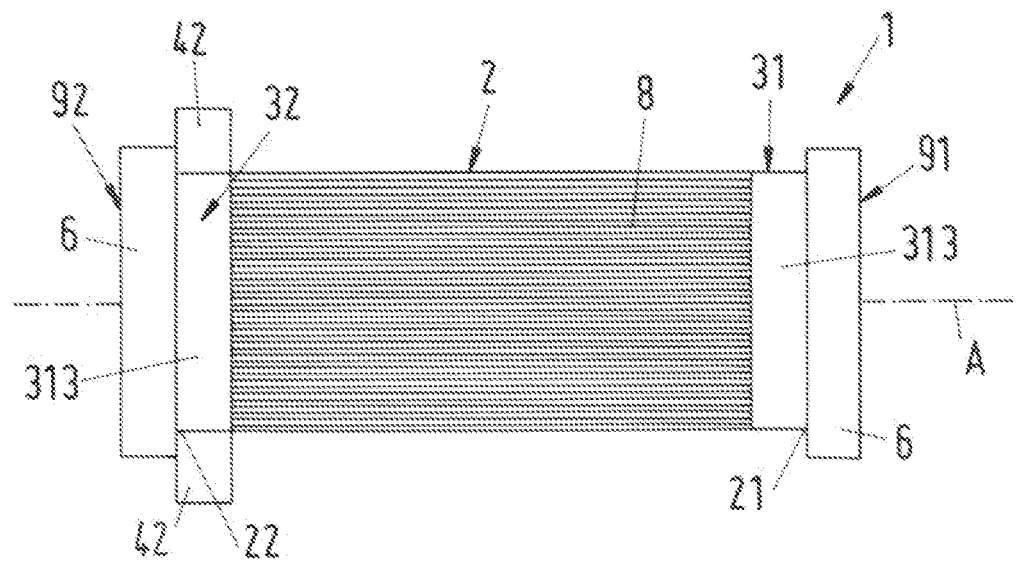
FIG. 18 is a schematic representation of a fourth embodiment of a cross-flow fan according to the invention.

FIG. 17 illustrates in a very schematic representation a third embodiment of a cross-flow fan 1 according to the invention. FIG. 18 illustrates in a very schematic representation a fourth embodiment of a cross-flow fan 1 according to the invention. In the following description of the third and fourth embodiment, only the differences from the first and second embodiment and their variants will be discussed in more detail. Otherwise, the explanations with respect to the first and second embodiment and their variants also apply in the same way or in the analogously same way to the third and fourth embodiment. In the third and fourth embodiment, the same parts or parts equivalent in function are designated with the same reference signs as in the previously described embodiments.

The substantial difference between the third and the fourth embodiment on the one hand and the first two embodiments on the other hand is that in the third and in the fourth embodiment the second stator 42 is designed only as a bearing stator, which thus cannot perform a drive function. Thus, the second stator 42 can only exert a levitation force to magnetically levitate the second magnetically effective core 32, but the second bearing stator 42 cannot generate a torque that contributes to driving the impeller 2. Thus, in the third and fourth embodiment, only the first stator 41, which interacts with the first magnetically effective core 31 as the first electromagnetic rotary drive, can provide a torque that drives the impeller 2 to rotate about the axial direction A.

The second stator 42 interacts with the second magnetically effective core 32 only as a magnetic bearing, which magnetically levitates the second end 22 of the impeller 2 with respect to the second stator 42. In particular, the second stator 42 and the second magnetically effective core 32 can be designed like any magnetic bearing known in the state of the art and suitable for levitating the second magnetically effective core. Preferably, the second stator 32 is designed such that it magnetically levitates the second magnetically effective core 32 only with stationary, i.e., non-rotating, magnetic fields.

In the third embodiment represented in FIG. 17, the second stator 42 is arranged radially inwardly in the impeller 2. The control device 6 for the second stator 42 is preferably arranged in a part of the second stator housing 92 which is located outside the impeller 2.

In the fourth embodiment represented in FIG. 18, the second stator 42 is arranged radially outwardly around the second magnetically effective core 32.

What is claimed:

1. A cross-flow fan for generating a fluid flow, comprising:
a cylindrical impeller extending in an axial direction from a first end to a second end, the cylindrical impeller including an annularly designed first magnetically effective core disposed at the first end, an annularly designed second magnetically effective core disposed at the second end, a plurality of vanes, each of the plurality of vanes being arranged between the first magnetically effective core and the second magnetically effective core with respect to the axial direction, and extending in the axial direction from a sheath, the sheath enclosing the magnetically effective core and configured to reduce eddy current losses;
a first stator, which is a bearing and drive stator, and which interacts with the first magnetically effective core as a first electromagnetic rotary drive; and
a second stator, which is at least a bearing stator, and with which the second magnetically effective core is capable of being magnetically levitated without contact with respect to the second stator,
the impeller configured to be magnetically driven without contact by the first and the second stators and to be magnetically levitated without contact with respect to the first stator and the second stator, the first stator arranged within the first magnetically effective core such that the first magnetically effective core surrounds the first stator, the first and second magnetically effective cores being configured to interact magnetically with the first and second stators to generate torque and generate forces for magnetic levitation.

2. The cross-flow fan according to claim 1, wherein the second stator is a bearing and drive stator configured to interact with the second magnetically effective core as a second electromagnetic rotary drive to exert a torque on the second magnetically effective core, and the second stator is arranged within the second magnetically effective core such that the second magnetically effective core surrounds the second stator.

3. The cross-flow fan according to claim 1, wherein the first stator is encapsulated in a first stator housing of a low-permeable material, and the second stator is encapsulated in a second stator housing of a low-permeable material.

4. The cross-flow fan according to claim 1, wherein the first stator includes a first stator housing and second stator includes a second stator housing, and first and second controllers configured to control or regulate a respective stator of the first and second stators is disposed in the first stator housing and second stator housing, respectively.

5. The cross-flow fan according to claim 4, wherein each of the first and second stator housings has a first housing portion and a second housing portion, and the first housing portion is arranged within the impeller and is surrounded by one of the first and second magnetically effective cores of the impeller, and the second housing portion has an outer diameter which is at least as large as an outer diameter of the one of the magnetically effective cores.

6. The cross-flow fan according to claim 5, wherein each of the first and second controllers is arranged in the second housing portion of the first and second stator housings, respectively.

7. The cross-flow fan according to claim 1, wherein the impeller is designed without a shaft.

8. The cross-flow fan according to claim 1, wherein each of the first and second stators comprises a plurality of coil cores, each of which extends in a radial direction, and each coil core carries exactly one concentrated winding.

9. The cross-flow fan according to claim 7, wherein a number of the plurality of coil cores for each of the first and second stators is exactly three, or exactly four, or exactly five, or exactly six.

10. The cross-flow fan according to claim 1, wherein each of the first and second magnetically effective cores of the impeller comprises a plurality of permanent magnets.

11. The cross-flow fan according to claim 10, wherein each permanent magnet of the plurality of permanent magnets is a ring segment, and the plurality of permanent magnets of each of the first and second magnetically effective cores complement each other to form a ring.

12. The cross-flow fan according to claim 10, wherein each permanent magnet of the plurality of permanent magnets is magnetized in a radial direction, and permanent magnets of the plurality of permanent magnets arranged adjacent to each other in a circumferential direction are each oppositely magnetized.

13. The cross-flow fan according to claim 10, wherein a number of permanent magnets of the plurality of permanent magnets for each of the first and second magnetically effective cores is exactly four, or exactly eight, or exactly ten, or exactly twelve.

14. The cross-flow fan according to claim 4, wherein a thermal protection layer is provided in each of the first and second stator housings between the first and second stators and the first and second controllers, respectively.

15. The cross-flow fan according to claim 1, wherein each of the first and second stators is coolable.

16. The cross-flow fan according to claim 3, wherein the first stator housing comprises a first housing portion which is arranged within the impeller.

\* \* \* \* \*